US011203961B2

(12) United States Patent
Chanko et al.

(10) Patent No.: US 11,203,961 B2
(45) Date of Patent: Dec. 21, 2021

(54) SYSTEMS AND METHODS FOR NICKEL-BASED GASOLINE PARTICULATE FILTER

(71) Applicant: Ford Global Technologies, LLC, Dearborn, MI (US)

(72) Inventors: Timothy Brian Chanko, Canton, MI (US); Xin Liu, Novi, MI (US); Douglas Allen Dobson, Ypsilanti, MI (US); Giovanni Cavataio, Dearborn, MI (US); Eva Thanasiu, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/816,820

(22) Filed: Mar. 12, 2020

(65) Prior Publication Data

US 2021/0285354 A1    Sep. 16, 2021

(51) Int. Cl.
  *F01N 3/035*   (2006.01)
  *F01N 3/28*    (2006.01)

(52) U.S. Cl.
  CPC .......... *F01N 3/2807* (2013.01); *F01N 3/035* (2013.01); *F01N 2370/02* (2013.01); *F01N 2510/0682* (2013.01); *F01N 2550/00* (2013.01)

(58) Field of Classification Search
  CPC .................. F01N 3/2807; F01N 3/035; F01N 2510/0682; F01N 2510/0684; F01N 2370/02; F01N 9/002; F01N 11/00; F01N 2550/00; F01N 2550/04
  See application file for complete search history.

(56) References Cited

U.S. PATENT DOCUMENTS

| 7,584,603 B2 * | 9/2009 | Kupe ................. B01D 53/9495 422/172 |
| 9,630,146 B2 | 4/2017 | Warner et al. |
| 2012/0233985 A1 * | 9/2012 | Chen ................... F01N 13/0097 60/274 |
| 2019/0048771 A1 | 2/2019 | Liu et al. |

FOREIGN PATENT DOCUMENTS

| GB | 2570556 A | | 7/2019 |
| JP | 06050221 | * | 2/1994 |
| KR | 20180075480 A | | 7/2018 |
| WO | 2019161775 A1 | | 8/2019 |

* cited by examiner

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for emissions control of a vehicle. In one example, an emissions treatment device includes a porous substrate and a catalytic washcoat disposed thereon, the catalytic washcoat having nickel and no other metal. The porous substrate may be configured to filter particulate matter (PM) exiting the vehicle and the catalytic washcoat may be configured to oxidize at least a portion of the PM. The nickel in the catalytic washcoat may provide additional oxygen storage capacity and increased tolerance to sulfur poisoning of catalytic activity of the catalytic washcoat, further promoting PM oxidation. Moreover, because the catalytic washcoat may increase PM oxidation during passive regeneration events, a total number of active regeneration events may be decreased and fuel economy may be maintained.

20 Claims, 6 Drawing Sheets

SYSTEMS AND METHODS FOR NICKEL-BASED GASOLINE PARTICULATE FILTER

FIELD

The present description relates generally to systems and methods for treating exhaust emissions from a vehicle engine, and in particular, treating the exhaust emissions with a gasoline particulate filter having a nickel-based washcoat.

BACKGROUND/SUMMARY

Multicomponent exhaust gas treatment systems are often employed to reduce emissions from an engine of a vehicle. Typically, each component catalyst of such systems may be directed toward reducing or storing certain classes of emissions. As an example, gasoline particulate filters (GPFs) may be implemented to store and oxidize soot and other particulate matter (PM) captured from exhaust gas in an exhaust passage.

Because GPFs have a finite storage capacity for PM, periodic regeneration may be desirable to reduce backpressure which may occur due to full, or nearly full, capacity GPFs blocking at least a portion of exhaust gas from exiting the vehicle. Such backpressure events may ultimately lower fuel economy, as an engine load may be increased to expel the exhaust gas. During regeneration, exhaust gas temperatures may increase to greater than a threshold regeneration temperature (e.g., 600° C.) such that soot oxidation may occur at a rate sufficient to burn off accumulated PM at the GPF and thereby reduce PM emissions and maintain fuel economy. Further, an oxygen-rich environment may be supplied, which may provide excess oxidants to further aid the soot oxidation.

Regeneration processes may generally be characterized as "passive" or "active." Passive regeneration may be accomplished during a typical drive cycle, where the exhaust gas temperature may exceed the threshold regeneration temperature during engine operation. In some examples, to provide the oxygen-rich environment, one or more fuel injectors may be deactivated during vehicle coasting in a so-called transient fuel shut off (TFSO) event.

However, conditions generated during a typical drive cycle may depend upon a specific vehicle operator and vehicle. As such, in some circumstances, conditions for regeneration may not be realized during typical engine operation (e.g., the exhaust gas temperature may remain below the threshold regeneration temperature for an extended duration). In such circumstances, active regeneration may be implemented, whereby engine operating conditions may be calibrated to generate higher exhaust gas temperatures. For example, the exhaust gas temperature may be increased by increasing fuel injection or delaying ignition or fuel injection timing. Such changes to engine operating conditions during active regeneration may negatively impact fuel economy. Accordingly, an overall reduction of active regeneration processes may be desirable.

Other attempts to reduce active regeneration include manufacturing a GPF with a catalytic metal washcoat, which may enhance an overall soot oxidation capacity of the GPF. One example approach is shown by Qi et al. in International Patent Publication No. 2019/161775. Therein, a platinum-based catalyst is washcoated onto a GPF to promote PM oxidation.

However, the inventors herein have recognized potential issues with such systems. As one example, since platinum and other platinum group metals (PGMs; e.g., palladium, rhodium) may be considered low-abundance metals, such metals may have a high cost due to a limited overall supply and corresponding difficulties in mining and processing. In contrast, catalysts based upon more cost-effective and abundant metals, such as nickel, have been shown in some examples (e.g., in three-way catalysts) to exhibit greater oxygen storage functionality and an increased tolerance to sulfur "poisoning" (e.g., deactivation of catalytic activity by sulfur in exhaust gas) than PGM-based catalysts. Indeed, though the platinum-based catalyst of Qi et al. may optionally include additional metals, platinum is employed in each washcoat composition disclosed therein.

In one example, the issues described above may be addressed by an emissions treatment device for a vehicle including a porous substrate configured to filter soot from exhaust gas exiting the vehicle, and a catalyst washcoat loaded on the porous substrate, the catalyst washcoat being configured to oxidize the soot during vehicle operation, wherein the catalyst washcoat may include nickel and no other catalytically-active metal. In this way, a nickel-washcoated GPF may be implemented to promote soot oxidation during passive regeneration and thereby maintain fuel economy by reducing a total number of active regeneration events. Further, the nickel-washcoated GPF may provide an increased oxygen storage capacity and an increased tolerance to sulfur poisoning (each of which may further promote soot oxidation) and may have a decreased overall cost relative to a PGM-washcoated GPF.

As one example, a GPF may include a plurality of passages whereupon a first catalytic washcoat having nickel may be disposed. In some examples, the first catalytic washcoat may be limited to a portion of a length of each of the plurality of passages, such that a minimum amount of the first catalytic washcoat may be used to achieve a threshold soot oxidation capacity or a threshold oxygen storage capacity. In further examples, a second catalytic washcoat having one or more PGMs may be disposed on a remaining portion of the length of each of the plurality of passages to further promote soot oxidation. In this way, configurations of the GPF may be varied such that the overall cost of the GPF may remain low while maintaining or improving soot oxidation.

As another example, an exhaust gas treatment system may include two GPFs disposed in series in an exhaust passage, such that an upstream one of the two GPFS having no catalytic washcoat may provide additional protection to a downstream one of the two GPFs having a nickel-based catalytic washcoat. Since the upstream GPF may accumulate a portion of PM in the exhaust emissions, a usable life of the downstream GPF may be extended. Accordingly, a duration between regeneration events may be increased, thereby increasing a chance of opportunistically initiating a passive regeneration event. Further, as the upstream GPF may be washcoat-free, an overall cost of the exhaust gas treatment system may be kept relatively low. In this way, a dual-GPF exhaust gas treatment system may prolong a regeneration cycle of the GPFs therein, thereby reducing the total number of active regeneration events and maintaining a relatively low cost by extending the usable life of each GPF.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
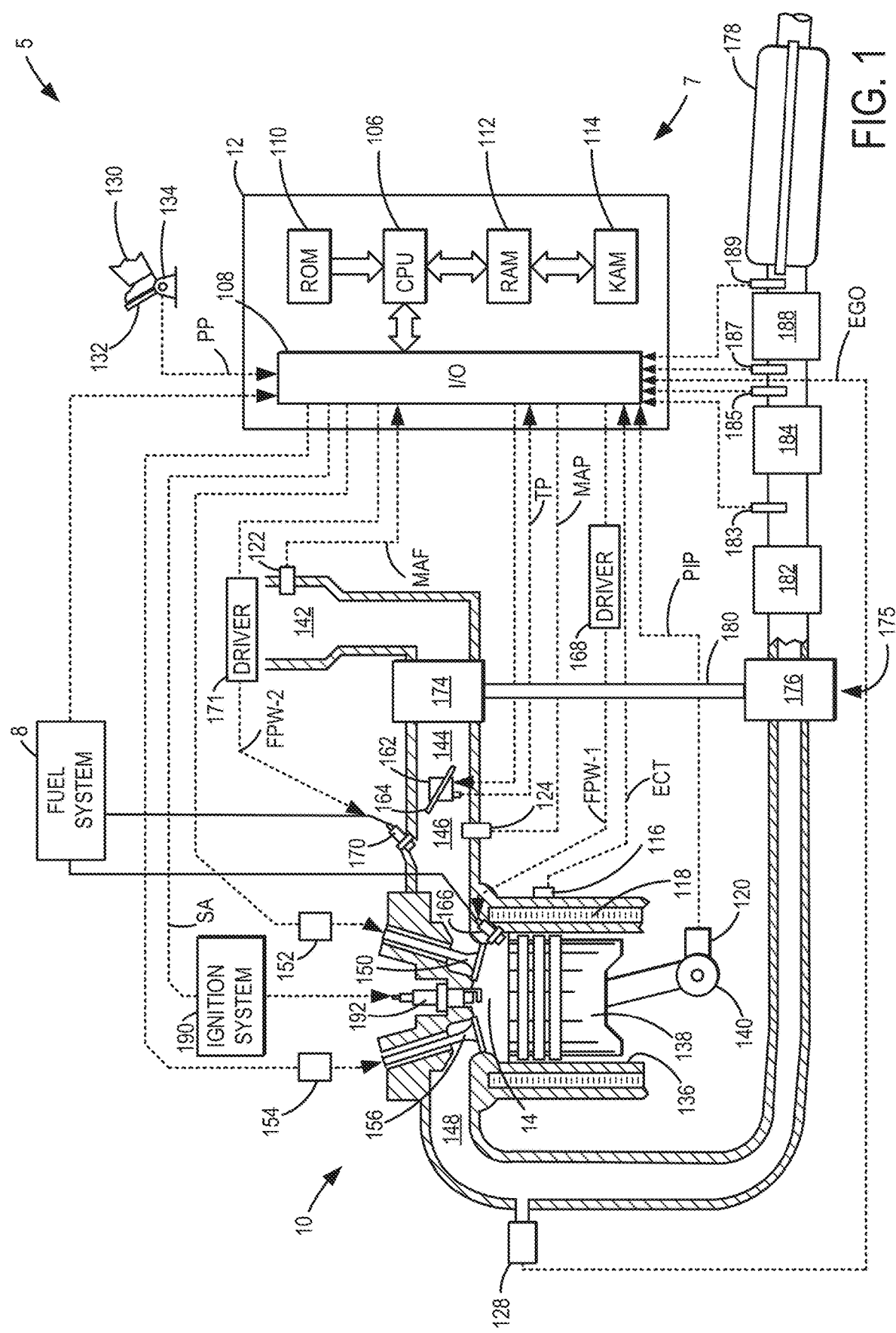
FIG. 1 shows a schematic diagram of an example cylinder of a multi-cylinder engine with an exemplary exhaust gas treatment system.
Figure 2:
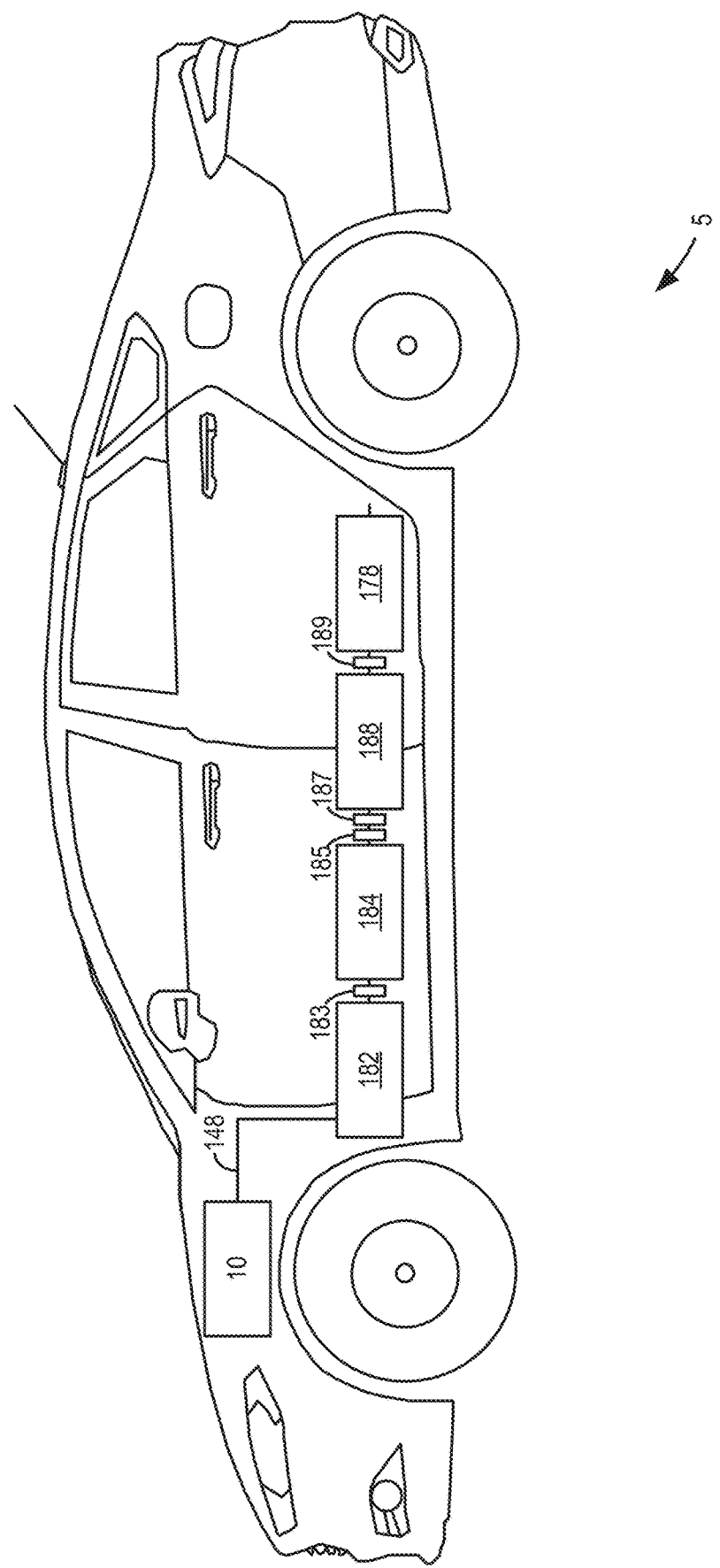
FIG. 2 shows a schematic diagram of the exemplary exhaust gas treatment system.
Figure 6:
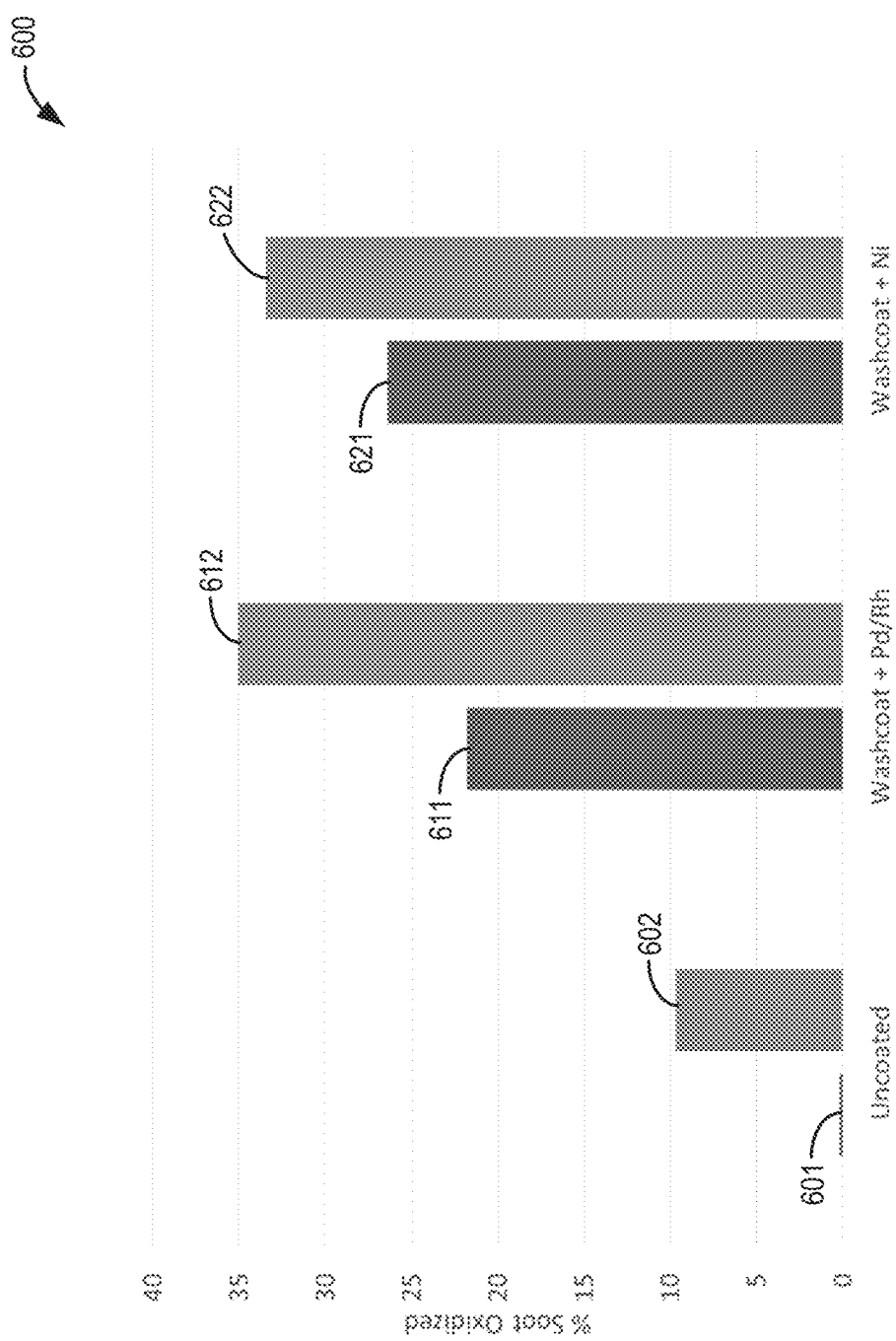
FIG. 6 shows a plot illustrating soot oxidation capacities for three exemplary GPFs.

The following description relates to systems and methods for treating exhaust emissions with an exhaust gas treatment system including a gasoline particulate filter (GPF) having a nickel-based washcoat. For example, an exemplary vehicle is depicted in FIGS. 1 and 2, wherein the vehicle includes the exhaust gas treatment system, the exhaust gas treatment system including the GPF having the nickel-based washcoat. The GPF may receive the exhaust emissions at an inlet face, whereby the exhaust emissions may pass through the GPF and exit the GPF at an outlet face. Accordingly, an exemplary inlet face and an exemplary outlet face of the GPF are respectively depicted in FIGS. 3A and 3B. Various exemplary configurations of one or more washcoats included in the GPF are depicted in FIGS. 4A-4D. Further, FIG. 6 depicts a plot comparing the GPF having the nickel-based washcoat with other GPFs not having nickel.

In some examples, a control routine may be implemented at a controller further included in the vehicle and configured to alter engine operating conditions or parameters to regenerate one or more GPFs. For example, the control routine may be the method depicted at FIG. 5 for passively and actively regenerating two GPFs in an exemplary exhaust gas treatment system. The method may further include diagnosing the two GPFs to determine respective degradation states thereof.

Referring now to FIG. 1, an example of a cylinder of internal combustion engine 10 included in an engine system 7 of vehicle 5 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of vehicle 5 via a transmission system. Further, a starter motor (not shown) may be coupled to crankshaft 140 via a flywheel to enable a starting operation of engine 10.

Cylinder 14 may receive intake air via a series of intake air passages 142, 144, and 146. Intake air passage 146 may communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along an exhaust passage 148. Compressor 174 may be at least partially powered by exhaust turbine 176 via a shaft 180. A throttle 162 including a throttle plate 164 may be provided along an intake passage of the engine for varying a flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. An upstream sensor 128 is shown coupled to exhaust passage 148 upstream of an underbody emissions treatment device 178 (and upstream of a first emissions treatment device 182, a second emissions treatment device 184, and a third emissions treatment device 188). Upstream sensor 128 may be selected from among various suitable sensors for providing an indication of exhaust gas air-fuel ratio such as a linear oxygen sensor or UEGO (universal or wide-range exhaust gas oxygen), a two-state oxygen sensor or EGO (as depicted), a HEGO (heated EGO), an HC, CO, or $NO_x$ sensor, for example. In other examples, the upstream sensor 128 may be a pressure sensor for measuring an exhaust gas pressure in the exhaust passage 148.

Herein, when referring to components (e.g., sensors, emission treatment devices, etc.) disposed in the exhaust passage 148, "upstream" may refer to a position of one component being closer to the engine 10 than a position of another component; similarly, "downstream" may refer to a position of one component being farther from the engine 10 than a position of another component.

Underbody emissions treatment device 178 may be a three way catalyst (TWC), HC trap, $NO_x$ trap, GPF, various other emissions treatment devices, or combinations thereof. In one example, the underbody emissions treatment device 178 is arranged in a far vehicle underbody. Comparatively, this location may be downstream of a close-coupled location, such as the location of first emissions treatment device 182. In this way, the first emissions treatment device 182 is arranged upstream of each of a second emissions treatment device 184, a third emissions treatment device 188, and the underbody emissions treatment device 178. Accordingly, the first emissions treatment device 182 may serve a protective role for other emissions treatment devices (e.g., 184, 188) disposed downstream from the first emissions treatment device 182 in the exhaust passage 148. That is, the first emissions treatment device 182 may extend a useful life of such downstream emissions treatment devices by providing one or more similar emissions treatment functionalities.

In one example, the first emissions treatment device 182 may be a TWC, GPF, a transition metal catalyst, or combinations thereof. For example, the first emissions treatment device 182 may be a GPF (such as the GPFs described below with reference to FIGS. 3A-4D) including a porous substrate or support material, such as a ceramic honeycomb wall flow monolith, where the porous substrate may include a plurality of passages or channels therein. In some examples, the ceramic honeycomb wall flow monolith may be configured to force exhaust gas through walls of the wall flow monolith via plugging of every other passage therein, such that emissions may be treated and/or captured. In other examples, the wall flow monolith may be formed from other materials, such as silicon carbide, aluminum titanate, or a metal or metal-alloy based material. In some examples, the plurality of passages may have a catalytic washcoat disposed thereon, wherein the catalytic washcoat includes one or more of Ni, Pt, Pd, and Rh. In one example, the porous substrate may be substantially free of any catalytic washcoat.

A second emissions treatment device 184 may be arranged in a location between the first emissions treatment device 182 and the third emissions treatment device 188. In this way, the second emissions treatment device 184 may be arranged downstream of the first emissions treatment device 182 and upstream of each of the third emissions treatment device 188 and the underbody emissions treatment device 178. In some examples, the second emissions treatment device 184 may be closer to the first emissions treatment device 182 and the third emissions treatment device 188 than the underbody emissions treatment device 178.

In one example, the second emissions treatment device 184 may be a TWC, GPF, a transition metal catalyst, or a combination thereof. For example, the second emissions treatment device 184 may be a GPF (such as the GPFs described below with reference to FIGS. 3A-4D) including a porous substrate or support material, such as a ceramic honeycomb wall flow monolith. Accordingly, the porous substrate may include a plurality of passages or channels therein. In some examples, the plurality of passages may have a catalytic washcoat disposed thereon, wherein the catalytic washcoat includes one or more of Ni, Pt, Pd, and Rh. In one example, the catalytic washcoat may include a single metal. For example, the catalytic washcoat may include Ni and no other metal.

A third emissions treatment device 188 may be arranged in a location between the second emissions treatment device 184 and the underbody emissions treatment device 178. In this way, the third emissions treatment device 188 may be arranged downstream of each of the first emissions treatment device 182 and the second emissions treatment device 184 and upstream of the underbody emissions treatment device 178. In some examples, the third emissions treatment device 188 may be closer to the first emissions treatment device 182 and the second emissions treatment device 184 than the underbody emissions treatment device 178.

In one example, the third emissions treatment device 188 may be a TWC, GPF, a transition metal catalyst, or a combination thereof. For example, the third emissions treatment device 188 may be a GPF (such as the GPFs described below with reference to FIGS. 3A-4D) including a porous substrate or support material, such as a ceramic honeycomb wall flow monolith. Accordingly, the porous substrate may include a plurality of passages or channels therein. In some examples, the plurality of passages may have a catalytic washcoat disposed thereon, wherein the catalytic washcoat includes one or more of Ni, Pt, Pd, and Rh.

It will be appreciated that while the depicted example shows four distinct emissions treatment devices (e.g., 182, 184, 188, 178) coupled to the exhaust passage 148, in other examples, a larger or smaller number of emissions treatment devices may be present. Further, multiple copies of a given emissions treatment device may be present in the depicted order, or in a different order. As to the depicted order, functions of component catalysts may be dependent upon one another to effectively treat exhaust emissions.

A difference between the close-coupled location and the far vehicle underbody location may include a distance from the engine, wherein the close-coupled location is closer to the engine than the far vehicle underbody location. That is to say, components in the close-coupled location are upstream of components in the far vehicle underbody location. Further, exhaust gas temperatures experienced by components in the close-coupled location may be higher than exhaust gas temperatures experienced by components in the far vehicle underbody position.

A first sensor 183 may be arranged between the first emissions treatment device 182 and the second emissions treatment device 184. Further, a second sensor 185 and a third sensor 187 may be arranged between the second emissions treatment device 184 and the third emissions treatment device 188. Further, a fourth sensor 189 may be arranged between the third emissions treatment device 188 and the underbody emissions treatment device 178. Sensors 183, 185, 187, and 189 may independently include one or more of a temperature sensor, an exhaust gas sensor (e.g., an HC, CO, or $NO_x$ sensor), an oxygen sensor, a pressure sensor, and the like. In some examples, feedback from the sensors 128, 183, 185, 187, and/or 189 may be used by the controller 12 to infer degradation of one or more of the emissions treatment devices and notify the operator of any inferred degradation.

It will be appreciated that while the depicted example shows four distinct sensors 183, 185, 187, and 189 coupled to the exhaust passage 148, in other examples, a larger or smaller number of sensors may be present. Further, multiple copies of a given sensor may be present in the depicted order, or in a different order.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 may provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating engine 10 with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of the intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent or allow the least amount of air from the intake passage 146 to enter the cylinder 14 than any other position of the intake valve 150. Thus, the positions between the fully open and fully closed position may allow varying amounts of air to flow between the intake passage 146 and the cylinder 14. In one example, moving the intake valve 150 to a more open position allows more air to flow from the intake passage 146 to the cylinder 14 than its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations, etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization may include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The controller 12 receives signals from the various sensors of FIG. 1 and then may notify the vehicle operator 130 of potential issues and/or employ the various actuators of FIG. 1 to adjust engine operation based on the received signals and instructions stored on a memory of the controller. That is, the non-transitory read-only memory chip 110 may be programmed with non-transitory, computer readable data representing instructions executable by the microprocessor unit 106 for performing the various diagnostic routines. Accordingly, an exemplary diagnostic routine is provided by the method described in detail below with reference to FIG. 5.

Specifically, in examples where at least one of the emissions treatment devices (e.g., 178, 182, 184, 188) is a GPF, the controller 12 may be operable to alter at least one of a plurality of engine operating conditions or parameters so as to generate an oxygen-rich environment to promote passive regeneration of the GPF. For instance, one or more fuel injectors (e.g., 166, 170) may be deactivated during vehicle coasting in a transient fuel shut off (TFSO) event. Further, at least one of the plurality of engine operating conditions may be altered so as to actively regenerate the GPF. For instance, fuel injection by one or more fuel injectors may be increased, ignition (spark) may be delayed, or fuel injection timing may be delayed. In some examples, the controller 12 may further be operable to alter one or more of the plurality of engine operating conditions responsive to the GPF reaching a threshold state of degradation, such as adjusting one or more fuel injectors, the adjusting throttle 162, etc. as based upon input from one or more of the sensors (e.g., 128, 183, 185, 187, 189).

Referring now to FIG. 2, the vehicle 5 of FIG. 1 is depicted. As such, components previously introduced may be similarly numbered with reference to FIG. 2. The vehicle 5 may include the engine 10, which may be fluidly coupled to the first emissions treatment device 182, the second emissions treatment device 184, the third emissions treatment device 188, and the underbody emissions treatment device via the exhaust passage 148. As described above with reference to FIG. 1, the first emissions treatment device 182 may be arranged in the close-coupled position, the underbody emissions treatment device 178 may be arranged in the far vehicle underbody position, and each of the second emissions treatment device 184 and the third emissions treatment device 188 may be arranged therebetween.

Exhaust gas may exit the engine 10 through the exhaust passage 148 and flow through each of the first emissions treatment device 182, the second emissions treatment device 184, the third emissions treatment device 188, and the underbody emissions treatment device 178 in sequence before exiting the vehicle 5. Therein, each of the first emissions treatment device 182, the second emissions treatment device 184, the third emissions treatment device 188, and the underbody emissions treatment device 178 may provide one or more catalytic or trapping functionalities to treat the exhaust gas. For instance, at least one of the first emissions treatment device 182, the second emissions treatment device 184, the third emissions treatment device 188, and the underbody emissions treatment device 178 may include a catalytic washcoat disposed on surfaces of a plurality of passages of a porous substrate, as described in further detail below with reference to FIGS. 3A-4D. In some examples, the catalytic washcoat may include nickel and no other catalytically-active metal. Specifically, the porous substrate may retain particulate matter (PM), such as soot, during vehicle operation and then may release the PM during a regeneration event. Accordingly, the regeneration event may selectively occur when conditions at the porous substrate promote nickel-catalyzed oxidation of the released PM. Nickel may further provide increased oxygen storage capacity and increased tolerance to sulfur "poisoning" (e.g., deactivation of catalytic activity by sulfur in the exhaust gas) relative to some other catalytically-active metals, such as platinum group metals (PGMs, e.g., Pt, Pd, Rh), which may further augment the oxidative capacity of the catalytic washcoat including nickel.

The first emissions treatment device 182 may be positioned in the exhaust passage 148 at a close-coupled distance downstream of the engine 10, such as in a range of 13-33 cm downstream of the engine 10, as one example. The underbody emissions treatment device 178 may be downstream of the first emissions treatment device 182 by a suitable distance, such as a distance of 25 cm or more, as one example. Each of the second emissions treatment device 184 and the third emissions treatment device 188, may be downstream of the first emissions treatment device 182 and upstream of the underbody emissions treatment device 178 within the exhaust passage 148, and may be respectively placed at any location between first emissions treatment device 182 and underbody emissions treatment device 178 such that the second emissions treatment device 184 is disposed upstream of the third emissions treatment device 188.

In some examples, one or more of the emissions treatment devices (e.g., 178, 182, 184, 188) may be a GPF including a porous substrate. In additional or alternative examples, one or more of the emissions treatment devices may further include a catalytic washcoat, the catalytic washcoat including one or more metals having three-way catalytic (TWC), oxygen storage, and/or soot oxidation functionalities. In one example, the underbody emissions treatment device 178 may include a PGM-based washcoat having TWC functionality, such that $NO_x$, CO, and HCs left untreated by upstream emissions treatment devices may be treated prior to exiting the exhaust passage 148. For instance, a regeneration event of a GPF (e.g., one or more of emissions treatment devices 182, 184, and 188) disposed in the exhaust passage 148 upstream of the underbody emissions treatment device 178 may result in CO (e.g., from soot oxidation) and unconverted HCs, which may then be treated by the underbody emissions treatment device 178 prior to release of the exhaust gas from the vehicle 5. It will be appreciated that exhaust gas conditions conducive to the regeneration event (e.g., oxygen-rich air-fuel ratios) may be similarly conducive to the TWC (e.g., oxidative) functionality of the underbody emissions treatment device 178.

In a specific example, an upstream emissions treatment device (e.g., the first emissions treatment device 182 or the second emissions treatment device 184) may be a GPF having no catalytic washcoat. Further, an emissions treatment device disposed in the exhaust passage 148 downstream from the upstream emissions treatment device (e.g., the second emissions treatment device 184 or the third emissions treatment device 188) may be a GPF having a first catalytic washcoat including a single metal, the single metal being nickel. In another specific example, the upstream emissions treatment device may be the GPF having the first catalytic washcoat including the single metal, the single metal being nickel, and the downstream emissions treatment device may be a GPF having a second catalytic washcoat including one or more of nickel, platinum, palladium, and rhodium. In this way, the upstream emissions treatment device may provide protection to the downstream emissions treatment device by filtering at least a portion of PM in the exhaust gas. Specifically, configuring two GPFs to have differing compositions may reduce overall costs while retaining PM storage and oxidative advantages, as the composition of the upstream emissions treatment device may be selected to have a lower cost than the downstream emissions treatment device and the upstream emissions treatment device may extend a useful life of the downstream emissions treatment device by assuming at least a portion of the functionality thereof. Further, by disposing two GPFs in series, an average duration between regeneration events may be extended, increasing a chance of opportunistic vehicle operating conditions for passive regeneration (thereby reducing a total number of active regeneration events).

In some examples, each of the emissions treatment devices (e.g., 178, 182, 184, 188) may be physically separated from one another (e.g., by respective intervening exhaust passage segments or by additional emission treatment devices disposed therebetween). For example, a given emissions treatment device may include a catalytic washcoat including a reactive metal (e.g., Cu) which may deactivate or "poison" a catalytic washcoat on an adjacent emissions treatment device. As such, physical separation of the emissions treatment devices from one another may mitigate such catalytic poisoning.

In other examples, two of the emissions treatment devices (e.g., 178, 182, 184, 188) may be arranged adjacent to one another, such that the two of the emissions treatment devices may be directly coupled to one another (e.g., without intervening segments of exhaust passage). As such, for two separately coated monolith substrates, an outlet of an upstream emissions treatment device (e.g., 182 or 184) and an inlet of a downstream emissions treatment device (e.g., 184 or 188) may be in face-sharing contact. In additional or alternative examples, the third emissions treatment device 188 may be adjacent to the underbody emissions treatment device 178 such that the third emissions treatment device 188 and the underbody emissions treatment device 178 are directly coupled to one another in a like fashion.

In additional or alternative examples, at least three of the emissions treatment devices (e.g., 178, 182, 184, 188) may be arranged adjacent to one another, such that the at least three of the emissions treatment devices may be directly coupled to one another in sequence (e.g., without intervening segments of exhaust passage). In this way, one or more emissions treatment devices (e.g., 184 and/or 188) positioned between an upstream emissions treatment device (e.g., 182 or 184) and a downstream emissions treatment device (e.g., 188 or 178) may function as a physical barrier to separate the upstream and downstream emissions treatment devices from one another.

The underbody emissions treatment device 178 may experience exhaust gas temperatures lower than exhaust gas temperatures experienced by each of the first emissions treatment device 182, the second emissions treatment device 184, and the third emissions treatment device 188. This temperature difference may result in one or more of the emissions treatment device 182, 184, 188 degrading more quickly than the underbody emissions treatment device 178. As such, the underbody emissions treatment device 178 may include a first washcoat having a given functionality (e.g., TWC, oxygen storage, soot oxidation, etc.) even in examples wherein one of the emissions treatment device 182, 184, 188 includes a second washcoat having the same functionality.

In one example, the first sensor 183 may be arranged between the first emissions treatment device 182 and the second emissions treatment device 184 as shown. In additional or alternative examples, the second sensor 185 and the third sensor 187 may be sequentially arranged between the second emissions treatment device 184 and the third emissions treatment device 188 as shown. However, it will be appreciated that, in some examples, each of the second sensor 185 and the third sensor 187 may instead be arranged across from one another in the exhaust passage 148 as opposed to sequentially arranged as shown. In additional or alternative examples, the fourth sensor 189 may be arranged between the third emissions treatment device 188 and the underbody emissions treatment device 178.

It will be appreciated that a given sensor (e.g., 183, 185, 187, 189) disposed between two emissions treatment devices (e.g., 178, 182, 184, 188) may be arranged closer to one of the two emissions treatment devices than the other. As an example, the first sensor 183 may be arranged closer to either the first emissions treatment device 182 or the second emissions treatment device 184. As another example, one or both of the second sensor 185 and the third sensor 187 may be arranged closer to either the second emissions treatment device 184 or the third emissions treatment device 188. As yet another example, the fourth sensor 189 may be arranged closer to either the third emissions treatment device 188 or the underbody emissions treatment device 178. In a specific example, the first sensor 183 may be directly coupled to an outlet (e.g., downstream) face of the first emissions treatment device 182, each of the second sensor 185 and the third sensor 187 may be directly coupled to an outlet (e.g., downstream) face of the second emissions treatment device 184, and the fourth sensor may be directly coupled to an outlet (e.g., downstream) face of the third emissions treatment device 188.

In one example, engine operating parameters may be adjusted based on feedback from one or more of the sensors 183, 185, 187, 189. As an example, if one of the emissions treatment devices is a GPF, then a timing and type (e.g., passive or active) of regeneration event may be determined based on signals received from one or more of the sensors 183, 185, 187, 189, and at least one of the plurality of engine operating conditions may be correspondingly adjusted to initiate the regeneration event. As another example, if one of the emissions treatment devices is determined to be degraded beyond a threshold via a catalyst monitoring feedback loop based on signals received from one or more of the sensors 183, 185, 187, 189, then at least one of the plurality of engine operating conditions may be correspondingly adjusted to prevent further degradation.

Though FIG. 2 depicts a sequential arrangement of the first emissions treatment device 182, the first sensor 183, the second emissions treatment device 184, the second sensor 185, the third sensor 187, the third emissions treatment device 188, the fourth sensor 189, and the underbody emissions treatment device 178 along the exhaust passage 148, it will be appreciated that additions, omissions, and substitutions may be considered within the scope of the present disclosure. As non-limiting examples, a total number of emissions treatment devices may be increased or decreased (e.g., greater or less than four), a total number of sensors may be increased or decreased (e.g., greater or less than four), a sequential ordering of the emissions treatment devices and sensors may be altered from the shown sequential ordering, one or more emissions treatment devices may be substituted for one or more depicted emissions treatment devices, one or more sensors may be substituted for one or more depicted sensors, etc.

Figure 3A:
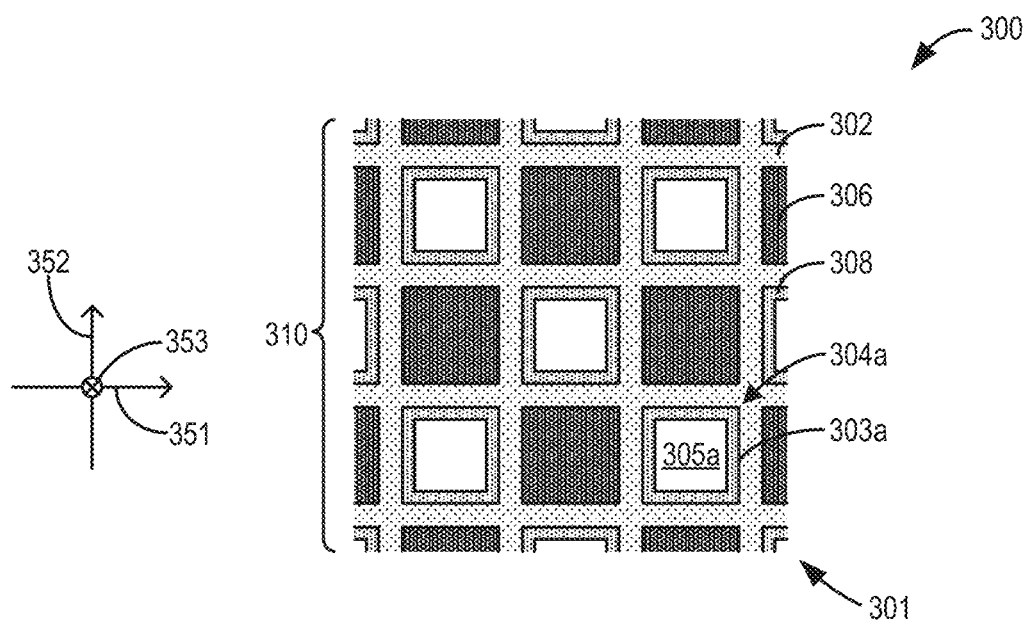
FIGS. 3A and 3B show schematic diagrams of an exemplary inlet face and an exemplary outlet face of a gasoline particulate filter (GPF) having a nickel-based washcoat.
Figure 3B:
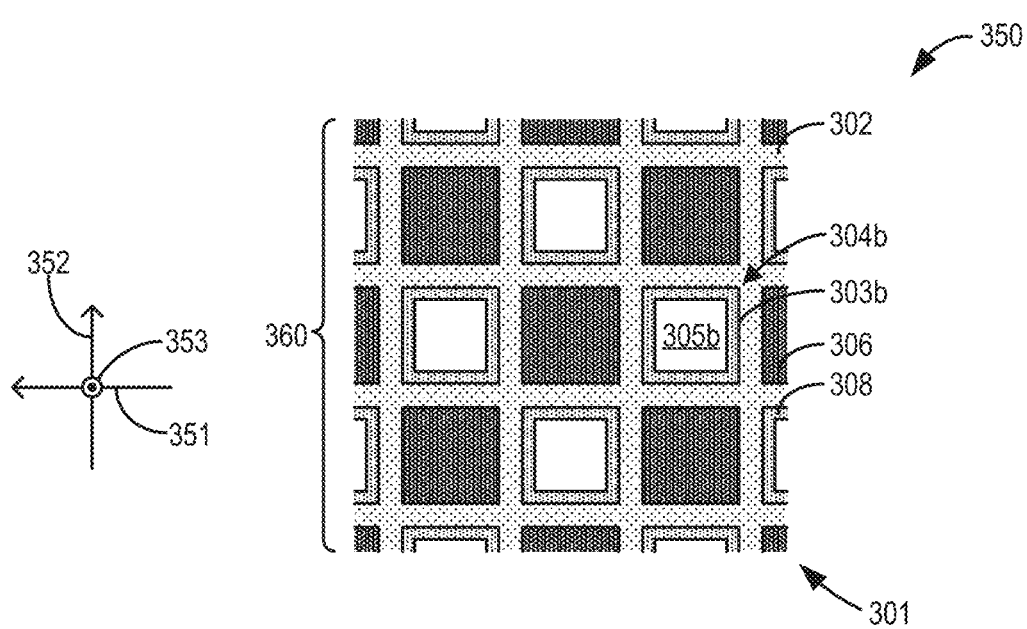

Referring now to FIGS. 3A and 3B, schematic diagrams 300 and 350 respectively illustrating an inlet face 310 and an outlet face 360 of a GPF 301 are depicted. In some examples, the GPF 301 may be one or more of the emissions treatment devices (e.g., 178, 182, 184, 188) described above with reference to FIGS. 1 and 2. It will be understood that further configurations may be considered within the scope of the present disclosure, and that the specific configurations depicted by FIGS. 3A and 3B are not to be taken as limiting. Further, it will be appreciated that in FIGS. 3A and 3B, and in FIGS. 4A-4D (described in more detail below), mutually perpendicular axes 351, 352, and 353 may define a three-dimensional space relative to schematic diagrams 300 and 350. Accordingly, schematic diagrams 300 and 350 respectively depict a top view of a portion of the inlet face 310 and the outlet face 360 parallel to a plane defined by the axes 351 and 352, where the axis 353 is normal to the planes of the top views. The axes 351, 352, and 353 are further depicted as having directionality, illustrating that the top view depicted by the schematic diagram 350 is rotated about the axis 352 relative to the top view depicted by the schematic diagram 300.

As shown, the GPF 301 may include a porous substrate 302 having a plurality of inlet passages 304a and a plurality of outlet passages 304b stoppered with plugs 306. As further shown, a catalytic washcoat 308 may be disposed on surfaces 303a of the plurality of inlet passages 304a and surfaces 303b of the plurality of outlet passages 304b. Specifically, the catalytic washcoat 308 may be deposited or coated onto each of the surfaces 303a of the plurality of inlet passages 304a and the surfaces 303b of the plurality of outlet passages 304b, such that the catalytic washcoat 308 may directly interact with the porous substrate 302.

In some examples, the porous substrate 302 may include cerium-based materials. For example, the porous substrate 302 may include one or more of cerium metal, ceria, and high-cerium zirconium oxide (e.g., $Ce_{0.75}Zr_{0.25}O_2$). In one example, the porous substrate 302 may be a ceramic honeycomb wall flow monolith. The cerium-based materials of the porous substrate 302 may accordingly confer oxygen storage capacity to the GPF 301 and may not react with metals in the catalytic washcoat 308.

Openings 305a of the plurality of inlet passages 304a may be provided on the inlet face 310, as shown in schematic diagram 300. In some examples, the plurality of inlet passages 304a may extend through a length of the GPF 301 parallel to the axis 353. However, in some examples, plugs 306 may stopper or fill the plurality of inlet passages 304a at the outlet face 360. In other examples, the plurality of inlet passages 304a may not extend fully along the length of the GPF 301 along the axis 353. In such examples, the porous substrate 302 may instead be configured to stopper the plurality of inlet passages 304a such that no plugs 306 are included at the outlet face 360.

Similarly, openings 305b of the plurality of outlet passages 304b may be provided on the outlet face 360, as shown in schematic diagram 350. In some examples, the plurality of outlet passages 304b may extend through a length of the GPF 301 parallel to the axis 353. However, in some examples, the plugs 306 may stopper or fill the plurality of outlet passages 304b at the inlet face 310. In other examples, the plurality of outlet passages 304b may not extend fully along the length of the GPF 301 along the axis 353. In such examples, the porous substrate 302 may instead be configured to stopper the plurality of outlet passages 304b such that no plugs 306 are included at the inlet face 310.

As shown in schematic diagram 300, the plurality of inlet passages 304a may be arranged in a gridlike configuration. Specifically, an alternating array of openings 305a and plugs 306 may be provided in the inlet face 310, such that any given pair of openings 305a may not be directly adjacent to one another along either of the axes 351 or 352 and any given pair of plugs 306 may not be directly adjacent to one another along either of the axes 351 or 352. Instead, the opening 305a to any given inlet passage 304a may be directly adjacent to at least one plug 306 along the axis 351 and at least one plug 306 along the axis 352.

Similarly, as shown in schematic diagram 350, the plurality of outlet passages 304b may be arranged in a gridlike configuration. Specifically, an alternating array of openings 305b and plugs 306 may be provided in the outlet face 360, such that any given pair of openings 305b may not be directly adjacent to one another along either of the axes 351 or 352 and any given pair of plugs 306 may not be directly adjacent to one another along either of the axes 351 or 352. Instead, the opening 305b to any given outlet passage 304b may be directly adjacent to at least one plug 306 along the axis 351 and at least one plug 306 along the axis 352.

As shown, the catalytic washcoat 308 may be coated on the surfaces 303a of the plurality of inlet passages 304a and the surfaces 303b of the plurality of outlet passages 304b. Accordingly, the catalytic washcoat 308 may be considered to be discontinuously coated, as a portion of the catalytic washcoat 308 disposed on surfaces (e.g., 303a or 303b) of a given passage (e.g., 304a or 304b) may be discontinuous with a portion of the catalytic washcoat 308 disposed on surfaces (e.g., 303a or 303b) of another passage (e.g., 304a or 304b).

The catalytic washcoat 308 may include a catalytically-active metal. In some examples, the catalytically-active metal may include one or more of Ni, Pt, Pd, and Rh. In one example, the catalytically-active metal may include Ni and no other metal. The catalytic washcoat 308 may include an amount of the catalytically-active metal, such as Ni, directly loaded on the surfaces 303a, 303b of the passages 304a, 304b of the porous substrate 302. In some examples, the amount of the catalytically-active metal may not be sufficient to completely cover the surfaces 303a, 303b of the passages 304a, 304b. In other examples, the amount of the catalytically-active metal may completely cover the surfaces 303a, 303b of the passages 304a, 304b. In further examples, providing the amount of catalytically-active metal may reduce an induction period, or induction time period, of the catalytic washcoat 308.

A loading of the catalytically-active metal on the surfaces 303a, 303b of the passages 304a, 304b relative to a total volume of the GPF 301 may be greater than 0.15 g/in$^3$. In additional or alternative examples, the loading of the catalytically-active metal on the surfaces 303a, 303b of the passages 304a, 204b relative to the total volume of the GPF 301 may be less than 0.6 g/in$^3$. In some examples, the loading of the catalytically-active metal on the surfaces 303a, 303b of the passages 304a, 304b relative to the total volume of the GPF 301 may be about 0.3 g/in³. The catalytically-active metal may be present in the catalytic washcoat 308 in a total weight ratio of greater than about 15 wt. %. In additional or alternative examples, the catalytically-active metal may be present in the catalytic washcoat 308 in the total weight ratio of less than about 60 wt. %. In some examples, the catalytically-active metal may be present in the catalytic washcoat 308 in the total weight ratio of about 30 wt. %. The loading of the catalytically-active metal on the surfaces 303a, 303b of the passages 304a, 304b may not be linearly dependent upon the total weight ratio of the catalytically-active metal in the catalytic washcoat 308, as the catalytic washcoat 308 may include further components therein, which may alter the total weight ratio of the catalytically-active metal in the catalytic washcoat 308. Accordingly, a loading of the catalytic washcoat 308 relative to the total volume of the GPF 301 may be greater than about 0.1 g/in³. In additional or alternative examples, the loading of the catalytic washcoat 308 relative to the total volume of the GPF 301 may be less than about 3 g/in³. In some examples, the weight ratio of the catalytic washcoat 308 relative to the total volume of the GPF 301 may be about 1 g/in³.

In one example, the catalytic washcoat 308 may be prepared by forming a slurry of a carrier material (e.g., alumina, ceria, a cerium-zirconium mixed oxide, a zeolite, combinations thereof, etc.) and the catalytically-active metal. The porous substrate 302 may then be dipped into the slurry to form a coating of the catalytic washcoat 308 thereon. In some examples, the coating may further be aided by inducing a change in pressure (e.g., via a vacuum). In some examples, the carrier material may first be coated onto the porous substrate 302, followed by coating of the catalytically-active metal onto the carrier material. In additional or alternative examples, an aerosol may be formed of the carrier material and/or the catalytically-active metal, such that the porous substrate 302 may be coated via a spray technique to form the catalytic washcoat 308 thereon.

In this way, and as described in detail below with reference to FIGS. 4A-4D, exhaust gas passing through an exhaust passage (e.g., 148) in which the GPF 301 may be disposed may enter an opening 305a of a given inlet passage 304a, pass through the porous substrate 302 and the catalytic washcoat 308 coated on surfaces thereof, enter an outlet passage 304b adjacent to the given inlet passage 304a, and exit an opening 305b of the adjacent outlet passage 304b. Accordingly, PM may be filtered from the exhaust gas and stored in the porous substrate 302 of the GPF 301. Further, the catalytically-active metal in the catalytic washcoat 308 may promote oxidation of at least a portion of the PM and may increase an oxygen storage capacity and a tolerance to catalytic poisoning of the GPF 301. In specific examples wherein the catalytically-active metal includes nickel and no other metal, each of the oxygen storage capacity and the tolerance to sulfur poisoning of the GPF 301 may be increased relative to examples wherein the catalytically-active metal includes one or more PGMs.

Referring now to FIGS. 4A-4D, schematic diagrams 400, 420, 440, and 460 respectively illustrating exemplary configurations of GPFs 401, 421, 441, and 461 having one or more washcoats are depicted. In some examples, one or more of the GPFs 401, 421, 441, and 461 may be one or more of the emissions treatment devices (e.g., 178, 182, 184, 188) described above with reference to FIGS. 1 and 2. It will be understood that further configurations may be considered within the scope of the present disclosure, and that the specific configurations depicted by FIGS. 4A-4D are not to be taken as limiting. Further, it will be appreciated that schematic diagrams 400, 420, 440, and 460 depict respective cross-sectional views of portions of the GPFs 401, 421, 441, and 461 in a plane defined by the axes 352 and 353, where the axis 351 is normal to the plane of the cross-sectional views.

Figure 4A:
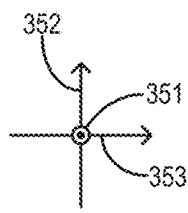
FIGS. 4A-4D show schematic diagrams of exemplary configurations of GPFs having one or more washcoats.
Figure 4A:
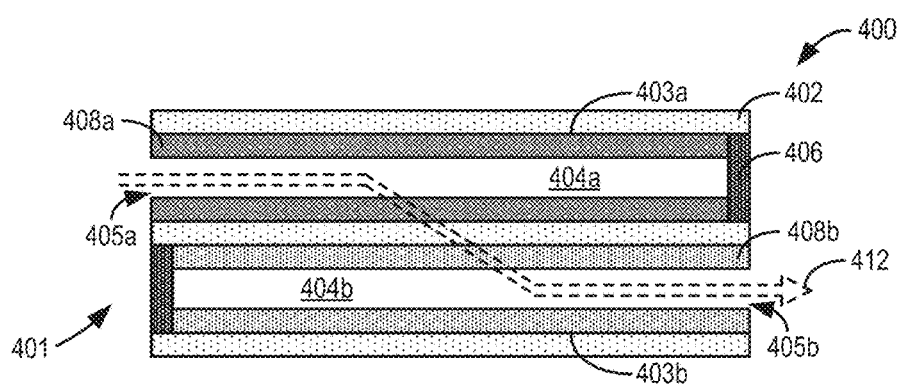

As shown in FIG. 4A as a first example, the GPF 401 may include a porous substrate 402 having a plurality of inlet passages 404a and a plurality of outlet passages 404b. Though schematic diagram 400 depicts one inlet passage 404a and one outlet passage 404b, it will be appreciated that the depicted inlet passage 404a and the depicted outlet passage 404b are respectively illustrative of the plurality of inlet passages 404a and the plurality of outlet passages 404b. Each of the plurality of inlet passages 404a may be stoppered by one of a plurality of plugs 406 at an opposing end of a length of the respective inlet passage 404a from an opening 405a. Similarly, each of the plurality of outlet passages 404b may be stoppered by one of the plurality of plugs 406 at an opposing end of a length of the respective outlet passage 404b from an opening 405b. As further shown, each of the openings 405a of the plurality of inlet passages 404a may be configured at an opposing end of a length of the GPF 401 along the axis 353 from each of the openings 405b of the plurality of outlet passages 404b.

A first catalytic washcoat 408a may be disposed on surfaces 403a of the plurality of inlet passages 404a. In some examples, the first catalytic washcoat 408a may be disposed along an entire length of each of the plurality of inlet passages 404a, that is, between a respective opening 405a and a respective plug 406. Similarly, a second catalytic washcoat 408b may be disposed on surfaces 403b of the plurality of outlet passages 404b. In some examples, the second catalytic washcoat 408b may be disposed along an entire length of each of the plurality of outlet passages 404b, that is, between a respective opening 405b and a respective plug 406.

One or both of the first catalytic washcoat 408a and the second catalytic washcoat 408b may include a metal, where the metal may be one or more of Ni, Pt, Pd, and Rh. In one example, one or both of the first catalytic washcoat 408a and the second catalytic washcoat 408b may include a single metal, the single metal being Ni. In some examples, the first catalytic washcoat 408a and the second catalytic washcoat 408b may have different compositions. In other examples, each of the first catalytic washcoat 408a and the second catalytic washcoat 408b may have the same composition.

As shown by schematic diagram 400, an exhaust gas may pass through the GPF 401 along a prophetic path 412. Specifically, the exhaust gas may enter the opening 405a of the inlet passage 404a, wherefrom the exhaust gas may pass through the first catalytic washcoat 408a to the porous substrate 402, wherein PM from the exhaust gas may be stored. When one or more engine operating conditions are opportunistically reached and/or actively altered to enter a regeneration event, the catalytic washcoats 408a, 408b may be activated so as to oxidize at least a portion of the PM and release stored oxygen (which may further promote PM oxidation). Further, during the regeneration event, the PM may be released from the porous substrate 402 and may continue along the prophetic path 412, passing through the second catalytic washcoat 408b to the outlet passage 404b. It will be appreciated that backpressure from upstream exhaust gas may prevent the stored PM from passing back through the first catalytic washcoat 408a to the inlet passage 404a. The exhaust gas may then exit from the outlet passage 404b via the opening 405b.

Figure 4B:
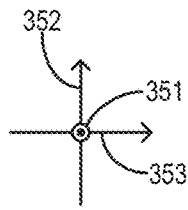
Figure 4B:
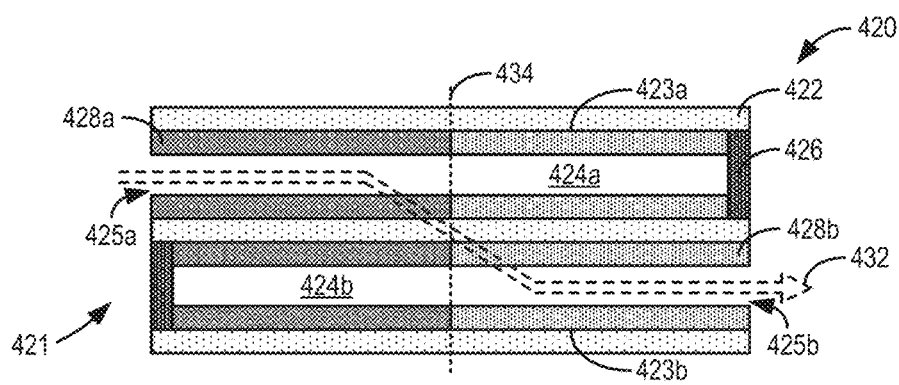

As shown in FIG. 4B as a second example, the GPF 421 may include a porous substrate 422 having a plurality of inlet passages 424a and a plurality of outlet passages 424b. Though schematic diagram 420 depicts one inlet passage 424a and one outlet passage 424b, it will be appreciated that the depicted inlet passage 424a and the depicted outlet passage 424b are respectively illustrative of the plurality of inlet passages 424a and the plurality of outlet passages 424b. Each of the plurality of inlet passages 424a may be stoppered by one of a plurality of plugs 426 at an opposing end of a length of the respective inlet passage 424a from an opening 425a. Similarly, each of the plurality of outlet passages 424b may be stoppered by one of the plurality of plugs 426 at an opposing end of a length of the respective outlet passage 424b from an opening 425b. As further shown, each of the openings 425a of the plurality of inlet passages 424a may be configured at an opposing end of a length of the GPF 421 along the axis 353 from each of the openings 425b of the plurality of outlet passages 424b.

Each of a first catalytic washcoat 428a and a second catalytic washcoat 428b may be disposed on surfaces 423a of the plurality of inlet passages 404a and surfaces 423b of the plurality of outlet passages 424b. In some examples, substantially all of the surfaces 423a, 423b are covered with the first catalytic washcoat 428a or the second catalytic washcoat 428b. For example, the first catalytic washcoat 428a may be disposed along a portion of a length of each of the plurality of inlet passages 424a, that is, along the axis 353 from a respective opening 425a to a plane 434, the axis 353 being normal to the plane 434. Accordingly, the second catalytic washcoat 428b may be disposed along a remaining portion of the length of each of the plurality of inlet passages 424a, that is, along the axis 353 from the plane 434 to a respective plug 426. Further, the first catalytic washcoat 428a may be disposed along a portion of a length of each of the plurality of outlet passages 424b, that is, along the axis 353 from a respective plug 426 to the plane 434. Accordingly, the second catalytic washcoat 428b may be disposed along a remaining portion of the length of each of the plurality of outlet passages 428b, that is, along the axis 353 from the plane 434 to a respective opening 425b. In some examples, the plane 434 may be positioned such that the plane 434 may bisect each of the plurality of inlet passages 424a and the plurality of outlet passages 424b along the axis 353. In this way, the first catalytic washcoat 428a and the second catalytic washcoat 428b may be arranged in a zoned configuration on the porous substrate 422.

In some examples, the portion of the length of each of the plurality of inlet passages 424a along which the first catalytic washcoat 428a may be disposed may be 30-70% of the entire length. For example, the first catalytic washcoat 428a may be disposed along substantially 50% of the length of each of the inlet passages 424a, such that the second catalytic washcoat 428b may also be disposed along substantially 50% (e.g., the remaining portion) of the length of each of the inlet passages 424a. Similarly, in some examples, the portion of the length of each of the plurality of outlet passages 424b along which the first catalytic washcoat 428a may be disposed may be 30-70% of the entire length. For example, the first catalytic washcoat 428a may be disposed along substantially 50% of the length of each of the outlet passages 424b, such that the second catalytic washcoat 428b may also be disposed along substantially 50% (e.g., the remaining portion) of the length of each of the outlet passages 424b.

One or both of the first catalytic washcoat 428a and the second catalytic washcoat 428b may include a metal, where the metal may be one or more of Ni, Pt, Pd, and Rh. In one example, one or both of the first catalytic washcoat 428a and the second catalytic washcoat 428b may include a single metal, the single metal being Ni. In some examples, the first catalytic washcoat 428a and the second catalytic washcoat 428b may have different compositions. In other examples, each of the first catalytic washcoat 428a and the second catalytic washcoat 428b may have the same composition.

As shown by schematic diagram 420, an exhaust gas may pass through the GPF 421 along a prophetic path 432. Specifically, the exhaust gas may enter the opening 425a of the inlet passage 424a, wherefrom the exhaust gas may pass through the first catalytic washcoat 428a to the porous substrate 422, wherein PM from the exhaust gas may be stored. It will be appreciated that the prophetic path 432 is merely exemplary and that the exhaust gas may also pass through the second catalytic washcoat 428b disposed on the surfaces 423a of the inlet passage 424a. When one or more engine operating conditions are opportunistically reached and/or actively altered to enter a regeneration event, the catalytic washcoats 428a, 428b may be activated so as to oxidize at least a portion of the PM and release stored oxygen (which may further promote PM oxidation). Further, during the regeneration event, the PM may be released from the porous substrate 422 and may continue along the prophetic path 432, passing through the second catalytic washcoat 428b to the outlet passage 424b. As noted above, as the prophetic path 432 is merely exemplary, the exhaust gas may also pass through the first catalytic washcoat 428a disposed on the surfaces 423b of the outlet passage 424b upon release from the porous substrate 422. It will be appreciated that backpressure from upstream exhaust gas may prevent the stored PM from passing back through the first catalytic washcoat 428a or the second catalytic washcoat 428b disposed on the surfaces 423a to the inlet passage 404a. The exhaust gas may then exit from the outlet passage 424b via the opening 425b.

Figure 4C:
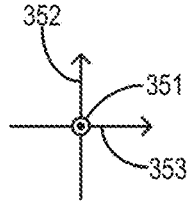
Figure 4C:
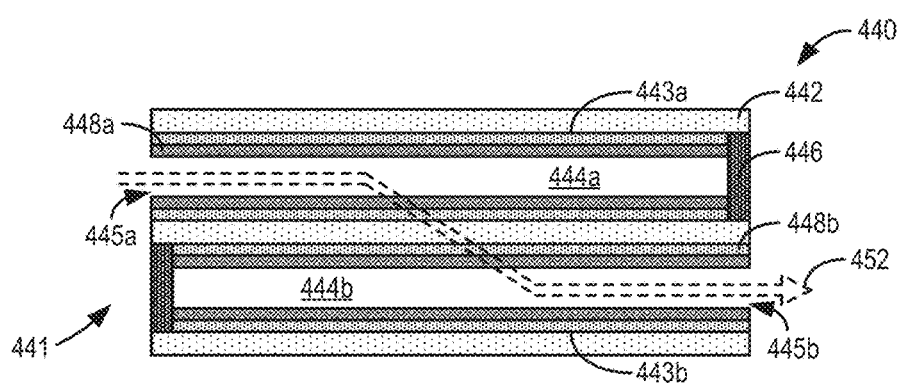

As shown in FIG. 4C as a third example, the GPF 441 may include a porous substrate 442 having a plurality of inlet passages 444a and a plurality of outlet passages 444b. Though schematic diagram 440 depicts one inlet passage 444a and one outlet passage 444b, it will be appreciated that the depicted inlet passage 444a and the depicted outlet passage 444b are respectively illustrative of the plurality of inlet passages 444a and the plurality of outlet passages 444b. Each of the plurality of inlet passages 444a may be stoppered by one of a plurality of plugs 446 at an opposing end of a length of the respective inlet passage 444a from an opening 445a. Similarly, each of the plurality of outlet passages 444b may be stoppered by one of the plurality of plugs 446 at an opposing end of a length of the respective outlet passage 444b from an opening 445b. As further shown, each of the openings 445a of the plurality of inlet passages 444a may be configured at an opposing end of a length of the GPF 441 along the axis 353 from each of the openings 445b of the plurality of outlet passages 444b.

A first catalytic washcoat 448a may be disposed on each of surfaces 443a of the plurality of inlet passages 444a and surfaces 443b of the plurality of outlet passages 444b. In some examples, the first catalytic washcoat 448a may be disposed along an entire length of each of the plurality of inlet passages 444a, that is, between a respective opening 445a and a respective plug 446, and an entire length of each of the plurality of outlet passages 444b, that is, between a respective opening 445b and a respective plug 446. Further, a second catalytic washcoat 448b may be disposed on the first catalytic washcoat 448a, such that the first catalytic washcoat 448a may be respectively interposed between the second catalytic washcoat 448b and the surfaces 443a, 443b. In some examples, the second catalytic washcoat 448b may be disposed along the entire length of each of the plurality of inlet passages 444a, that is, between a respective opening 445a and a respective plug 446, and an entire length of each of the plurality of outlet passages 444b, that is, between a respective opening 445b and a respective plug 446. In this way, the first catalytic washcoat 448a and the second catalytic washcoat 448b may be arranged in a layered configuration on the porous substrate 442.

One or both of the first catalytic washcoat 448a and the second catalytic washcoat 448b may include a metal, where the metal may be one or more of Ni, Pt, Pd, and Rh. In one example, one or both of the first catalytic washcoat 448a and the second catalytic washcoat 448b may include a single metal, the single metal being Ni. In some examples, the first catalytic washcoat 448a and the second catalytic washcoat 448b may have different compositions. In other examples, each of the first catalytic washcoat 448a and the second catalytic washcoat 448b may have the same composition.

As shown by schematic diagram 440, an exhaust gas may pass through the GPF 441 along a prophetic path 452. Specifically, the exhaust gas may enter the opening 445a of the inlet passage 444a, wherefrom the exhaust gas may sequentially pass through the second catalytic washcoat 448b and the first catalytic washcoat 448a disposed on the surfaces 443a to the porous substrate 442, wherein PM from the exhaust gas may be stored. When one or more engine operating conditions are opportunistically reached and/or actively altered to enter a regeneration event, the catalytic washcoats 448a, 448b may be activated so as to oxidize at least a portion of the PM and release stored oxygen (which may further promote PM oxidation). Further, during the regeneration event, the PM may be released from the porous substrate 442 and may continue along the prophetic path 452, sequentially passing through the first catalytic washcoat 448a disposed on the surfaces 443b and the second catalytic washcoat 448b to the outlet passage 444b. It will be appreciated that backpressure from upstream exhaust gas may prevent the stored PM from passing back through the first catalytic washcoat 448a to the inlet passage 444a. The exhaust gas may then exit from the outlet passage 444b via the opening 445b.

Figure 4D:
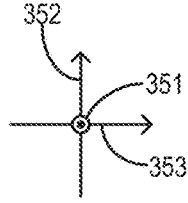
Figure 4D:
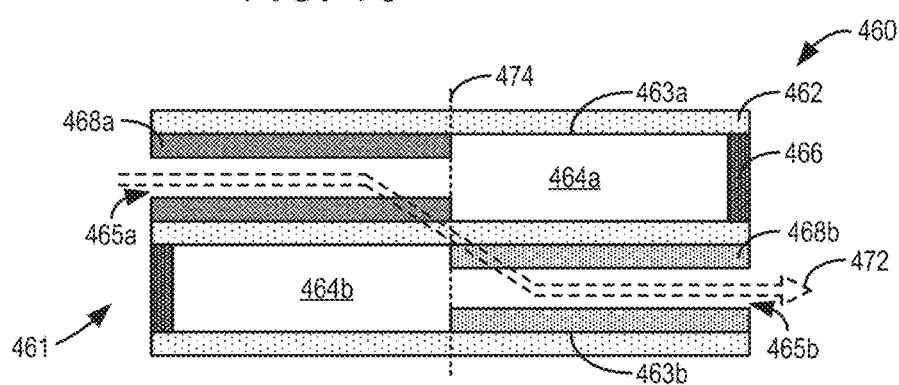

As shown in FIG. 4D as a fourth example, the GPF 461 may include a porous substrate 462 having a plurality of inlet passages 464a and a plurality of outlet passages 464b. Though schematic diagram 460 depicts one inlet passage 464a and one outlet passage 464b, it will be appreciated that the depicted inlet passage 464a and the depicted outlet passage 464b are respectively illustrative of the plurality of inlet passages 464a and the plurality of outlet passages 464b. Each of the plurality of inlet passages 464a may be stoppered by one of a plurality of plugs 466 at an opposing end of a length of the respective inlet passage 464a from an opening 465a. Similarly, each of the plurality of outlet passages 464b may be stoppered by one of the plurality of plugs 466 at an opposing end of a length of the respective outlet passage 464b from an opening 465b. As further shown, each of the openings 465a of the plurality of inlet passages 464a may be configured at an opposing end of a length of the GPF 461 along the axis 353 from each of the openings 465b of the plurality of outlet passages 464b.

A first catalytic washcoat 468a may be disposed on surfaces 463a of the plurality of inlet passages 464a. In some examples, the first catalytic washcoat 468a may be disposed along a portion of a length of each of the plurality of inlet passages 464a, that is, along the axis 353 from a respective opening 465a to a plane 474, the axis 353 being normal to the plane 474. Accordingly, a remaining portion of the length of each of the plurality of inlet passages 464a, that is, along the axis 353 from the plane 474 to a respective plug 466, may have no washcoat disposed thereon. Similarly, a second catalytic washcoat 468b may be disposed on surfaces 463b of the plurality of outlet passages 464b. In some examples, the second catalytic washcoat 468b may be disposed along a portion of a length of each of the plurality of outlet passages 464b, that is, along the axis 353 from the plane 474 to a respective opening 465b. Accordingly, a remaining portion of the length of each of the plurality of outlet passages 464b, that is, along the axis 353 from a respective plug 466 to the plane 474, may have no washcoat disposed thereon. In some examples, the plane 474 may be positioned such that the plane 474 may bisect each of the plurality of inlet passages 464a and the plurality of outlet passages 464b along the axis 353.

In some examples, the portion of the length of each of the plurality of inlet passages 464a along which the first catalytic washcoat 468a may be disposed may be 30-70% of the entire length. For example, the first catalytic washcoat 468a may be disposed along substantially 50% of the length of each of the inlet passages 464a, such that substantially 50% (e.g., the remaining portion) of the length of each of the inlet passages 464a may have no washcoat disposed thereon. Similarly, in some examples, the portion of the length of each of the plurality of outlet passages 464b along which the first catalytic washcoat 468a may be disposed may be 30-70% of the entire length. For example, the first catalytic washcoat 468a may be disposed along substantially 50% of the length of each of the outlet passages 464b, such that substantially 50% (e.g., the remaining portion) of the length of each of the outlet passages 464b may have no washcoat disposed thereon.

One or both of the first catalytic washcoat 468a and the second catalytic washcoat 468b may include a metal, where the metal may be one or more of Ni, Pt, Pd, and Rh. In one example, one or both of the first catalytic washcoat 468a and the second catalytic washcoat 468b may include a single metal, the single metal being Ni. In some examples, the first catalytic washcoat 468a and the second catalytic washcoat 468b may have different compositions. In other examples, each of the first catalytic washcoat 468a and the second catalytic washcoat 468b may have the same composition. In such examples, the GPF 461 may be considered to have one catalytic washcoat disposed along a portion of the length of each of the plurality of passages 464a, 464b, where a remaining portion of the length of each of the plurality of passages 464a, 464b may have no washcoat disposed thereon.

As shown by schematic diagram 460, an exhaust gas may pass through the GPF 461 along a prophetic path 472. Specifically, the exhaust gas may enter the opening 465a of the inlet passage 464a, wherefrom the exhaust gas may pass through the first catalytic washcoat 468a to the porous substrate 462, wherein PM from the exhaust gas may be stored. It will be appreciated that the prophetic path 472 is merely exemplary and that the exhaust gas may also enter the porous substrate 462 at a portion of the inlet passage 464a not having any catalytic washcoat disposed thereon. When one or more engine operating conditions are opportunistically reached and/or actively altered to enter a regeneration event, the catalytic washcoats 468a, 468b may be activated so as to oxidize at least a portion of the PM and release stored oxygen (which may further promote PM oxidation). Further, during the regeneration event, the PM may be released from the porous substrate 462 and may continue along the prophetic path 472, passing through the second catalytic washcoat 468b to the outlet passage 464b. As noted above, as the prophetic path 472 is merely exemplary, the exhaust gas may also be released from the porous substrate 462 at a portion of the outlet passage 464b not having any catalytic washcoat disposed thereon. It will be appreciated that backpressure from upstream exhaust gas may prevent the stored PM from passing back through the first catalytic washcoat 468a to the inlet passage 464a. The exhaust gas may then exit from the outlet passage 464b via the opening 465b.

Figure 5:
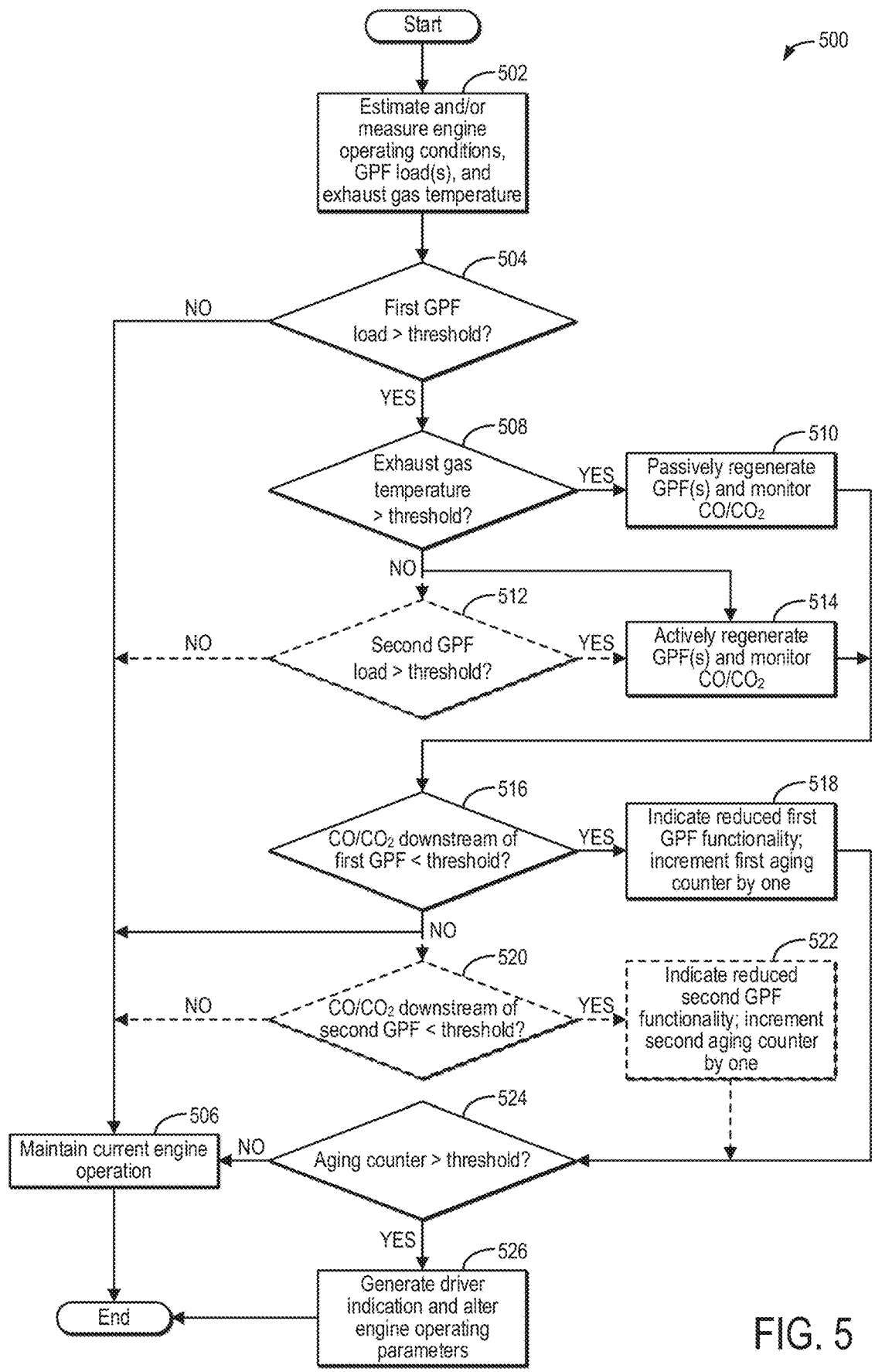
FIG. 5 shows a flow chart of a method for passively and actively regenerating one or more GPFs in the exemplary exhaust gas treatment system.

Referring now to FIG. 5, a flow chart of an example routine 500 for passively and actively regenerating one or more GPFs in the exemplary exhaust gas treatment system is depicted. In some examples, the exhaust gas treatment system may include a first GPF disposed in an exhaust passage of a vehicle. The first GPF may have a catalytic washcoat comprising nickel and no other metal. As an example, the first GPF may be the third emissions treatment device 188 of FIGS. 1 and 2. Accordingly, it will be appreciated that at least a portion of routine 500 may be employed to regenerate and monitor the first GPF absent any additional GPF. Elements which may be included in routine 500 for examples having a single GPF (e.g., the first GPF absent any additional GPF) are indicated with solid lines in FIG. 5. In such examples, and as employed hereinbelow, the first GPF may be referred to as the upstream GPF.

However, in some examples, the first GPF may have no catalytic washcoat, and the exhaust gas treatment system may further include a second GPF disposed in the exhaust passage upstream of the first GPF. The second GPF may instead have the catalytic washcoat comprising nickel and no other metal. As an example, the first GPF and the second GPF may respectively be the second emissions treatment device 184 and the third emissions treatment device 188 of FIGS. 1 and 2. Accordingly, in some examples, routine 500 may be employed to regenerate and monitor each of the first GPF and the second GPF. Elements which may be included in routine 500 for examples having two or more GPFs (e.g., the first GPF and the second GPF disposed in series in the exhaust passage) are indicated with solid and dashed lines in FIG. 5. In such examples, and as employed hereinbelow, the first GPF may be referred to as the upstream GPF and the second GPF may be referred to as the downstream GPF.

Instructions for carrying out routine 500 may be executed by a controller based on instructions stored on a memory of the controller and in conjunction with signals received from sensors of an engine system, such as the sensors described above with reference to FIGS. 1 and 2. For example, one or more of sensors 128, 183, 185, 187, and 189 may supply feedback to controller 12 of engine system 7. Further, the controller may employ engine actuators of the engine system to adjust engine operation, according to routine 500 as described below. As such, routine 500 may enable regeneration and diagnostic monitoring of one or more GPFs in an engine-propelled vehicle.

At 502, routine 500 may include estimating and/or measuring one or more of a load of the upstream GPF, a load of the downstream GPF, an exhaust gas temperature, and one or more engine operating conditions, including engine speed, engine load, engine temperature, ambient conditions (e.g., ambient temperature, pressure, humidity, etc.), current operator torque demand, manifold pressure, manifold air flow, fuel temperature, exhaust gas air-fuel ratio, etc. The one or more engine operating conditions may be measured by one or more sensors communicatively coupled to the controller (e.g., the exhaust gas temperature may be measured directly via one of the sensors 183, 185, 187, and 189) or may be inferred based on available data (e.g., the engine temperature may be estimated from an engine coolant temperature measured by an engine coolant temperature sensor).

As one example, the upstream GPF load may be determined based on an exhaust backpressure measured at a pressure sensor disposed in the exhaust passage upstream from the upstream GPF (e.g., the upstream sensor 128 or the first sensor 183). As another example, the downstream GPF load may be determined based on an exhaust backpressure measured at a pressure sensor disposed in the exhaust passage upstream from the downstream GPF (e.g., the second sensor 185 or the third sensor 187). As yet another example, the exhaust gas temperature may be measured at a temperature sensor disposed in the exhaust passage upstream of the upstream GPF (e.g., the upstream sensor 128 or the first sensor 183) or downstream of the upstream GPF (e.g., the second sensor 185 or the third sensor 187). As yet another example, the exhaust gas temperature may be measured at a temperature sensor disposed in the exhaust passage upstream of the downstream GPF (e.g., the second sensor 185 or the third sensor 187) or downstream of the downstream GPF (e.g., the fourth sensor 189).

Routine 500 may use the one or more engine operating conditions to infer a current state of engine operation, and then determine whether to alter the state of engine operation at least based on one or more of the upstream GPF load, the downstream GPF load, and the exhaust gas temperature. For example, at 504, routine 500 may include determining whether the upstream GPF load is greater than a first threshold GPF load. In some examples, the first threshold GPF load may be well below a GPF load at which the exhaust backpressure may significantly increase. If the upstream GPF load is less than or equal to the first threshold GPF load, routine 500 may proceed to 506, where routine 500 may include maintaining current engine operation. As such, GPF regeneration may not be initiated and routine 500 may then end.

If the upstream GPF load is greater than the first threshold GPF load, routine 500 may proceed to 508, where routine 500 may include determining whether the exhaust gas temperature is greater than a threshold temperature. In some examples, the threshold temperature may be an exhaust gas temperature at which GPF regeneration may proceed (e.g., 600° C. or greater). Thus, if the exhaust gas temperature is greater than the threshold temperature, the routine may proceed to 510, where routine 500 may include passively regenerating one or both of the upstream GPF and the downstream GPF and monitoring carbon monoxide (CO) and/or carbon dioxide ($CO_2$) in the exhaust gas.

In some examples, monitoring CO may include measuring an amount of CO via a CO sensor (e.g., the second sensor 185 or the third sensor 187) disposed in the exhaust passage downstream of the upstream GPF (e.g., between the upstream GPF and the downstream GPF) and/or a CO sensor (e.g., the fourth sensor 189) disposed in the exhaust passage downstream of the downstream GPF. However, though carbon in PM emissions may initially be oxidized to CO, the CO may further be oxidized to $CO_2$ by $NO_2$, as is shown by equations (1) and (2):

$$NO_2 + C \rightarrow NO + CO \quad (1)$$

$$NO_2 + CO \rightarrow NO + CO_2 \quad (2)$$

Accordingly, at least two moles (e.g., equivalents) of $NO_2$ may be consumed for each mole of carbon oxidized. As such, at 510, routine 500 may include monitoring $CO_2$ may include estimating an amount of $CO_2$ based on the amount of CO and an amount of $NO_2$, where the amount of $NO_2$ is determined based on measurements received from a $NO_x$ sensor (e.g., the second sensor 185 or the third sensor 187) disposed in the exhaust passage downstream of the upstream GPF (e.g., between the upstream GPF and the downstream GPF) and/or a $NO_x$ sensor (e.g., the fourth sensor 189) disposed downstream of the downstream GPF. For example, the controller may input the amount of CO and the amount of $NO_2$ into one or more look-up tables, functions, or maps stored in memory thereof, which may output the corresponding amount of $CO_2$.

In some examples, the one or more engine operating conditions may be altered so as to generate an oxygen-rich environment to promote the passive regeneration. In one example, a TFSO event may be initiated such that the air-fuel ratio of the exhaust gas may be increased to provide the oxygen-rich environment. For example, at 510, routine 500 may further include determining whether one or more TFSO entry conditions have been met based on the estimated and/or measured engine operation condition(s), and/or other vehicle operating conditions. For example, a combination of one or more of vehicle speed, vehicle acceleration, engine speed, engine load, throttle position, accelerator pedal position, transmission gear position, and various other parameters may be employed to determine whether the TFSO entry conditions have been met. In one example, the TFSO entry conditions may be confirmed based on engine speed being below a threshold engine speed. In another example, the TFSO entry conditions may be confirmed based on engine load or operator torque demand being below a threshold. In yet another example, the TFSO entry conditions may be confirmed based on a lower than threshold displacement of an accelerator position (e.g., operator release of the accelerator pedal, such as during coasting), such as upon initiation of a tip-out event.

If the exhaust gas temperature is less than or equal to the threshold temperature, routine 500 may proceed to 512, where routine 500 may include determining whether the downstream GPF load is less than a second threshold GPF load. In some examples, the second threshold GPF load may be well below a GPF load at which exhaust backpressure may significantly increase. In other examples, the second threshold GPF load may be just below or at the GPF load at which the exhaust backpressure may significantly increase. In some examples, the first threshold GPF load may be less than the second threshold GPF load. In other examples, the first threshold GPF load may be greater than the second threshold GPF load. In other examples, the first threshold GPF load may be substantially equal to the second threshold GPF load. If the downstream GPF load is less than or equal to the second threshold GPF load, routine 500 may proceed to 506, where routine 500 may include maintaining current engine operation. As such, GPF regeneration may not be initiated and routine 500 may then end.

If the downstream GPF load is greater than the second threshold GPF load, routine 500 may proceed to 514, where routine 500 may include actively regenerating one or both of the upstream and the downstream GPF and monitoring CO and/or $CO_2$ in the exhaust gas. To initiate active regeneration, one or more engine operating conditions may be altered to increase the exhaust gas temperature above the threshold temperature. In one example, fuel injection by one or more fuel injectors may be increased. In another example, ignition (spark) may be delayed. In yet another example, fuel injection by the one or more fuel injectors may be delayed.

In some examples, monitoring CO may include measuring the amount of CO via a CO sensor (e.g., the second sensor 185 or the third sensor 187) disposed in the exhaust passage downstream of the upstream GPF (e.g., between the upstream GPF and the downstream GPF) and/or a CO sensor (e.g., the fourth sensor 189) disposed in the exhaust passage downstream of the downstream GPF. In some examples, monitoring $CO_2$ may include estimating the amount of $CO_2$ as described above at 510, e.g., based on the amount of CO and the amount of $NO_2$, where the amount of $NO_2$ is determined based on measurements received from a $NO_x$ sensor (e.g., the second sensor 185 or the third sensor 187) disposed in the exhaust passage downstream of the upstream GPF (e.g., between the upstream GPF and the downstream GPF) and/or a $NO_x$ sensor (e.g., the fourth sensor 189) disposed downstream of the downstream GPF.

Once GPF regeneration has finished (e.g., at 510 or 514), routine 500 may include determining a total amount of CO and $CO_2$ downstream of the downstream GPF in the exhaust passage and/or a total amount of CO and $CO_2$ downstream of the upstream GPF in the exhaust passage (e.g., between the upstream GPF and the downstream GPF) based on the monitored CO and $CO_2$. In some examples, the total amounts of CO and $CO_2$ may be determined at a single instance or a short duration during the GPF regeneration. In some examples, the total amounts of CO and $CO_2$ may be determined over an entire duration of the GPF regeneration.

Accordingly, at 516, routine 500 may include determining whether the total amount of CO and $CO_2$ downstream of the upstream GPF (e.g., between the upstream GPF and the downstream GPF) is less than a first threshold amount. If the total amount of CO and $CO_2$ downstream of the upstream GPF is less than the first threshold amount, routine 500 may proceed to 518, where routine 500 may include indicating reduced upstream GPF functionality due to upstream GPF degradation and incrementing a first aging counter by one. Specifically, if the total amount of CO and $CO_2$ downstream of the upstream GPF is lower than expected (e.g., lower than the first threshold amount), then the controller may infer that the upstream GPF may no longer be efficiently storing PM emissions for oxidation during GPF regeneration (that is, the upstream GPF may have degraded from a full useful life state). In examples wherein the upstream GPF includes a catalytic washcoat, degradation of catalytic activity of the upstream GPF may further be indicated.

If the total amount of CO and $CO_2$ downstream of the upstream GPF (e.g., between the upstream GPF and the downstream GPF) is greater than or equal to the first threshold amount, routine 500 may proceed to 520, where routine 500 may include determining whether the total amount of CO and $CO_2$ downstream of the downstream GPF is less than a second threshold amount. In some examples, the first threshold amount may be less than the second threshold amount. In other examples, the first threshold amount may be greater than the second threshold amount. In other examples, the first threshold amount may be substantially equal to the second threshold amount.

If the total amount of CO and $CO_2$ downstream of the downstream GPF is greater than or equal to the second threshold amount, routine 500 may proceed to 506, where routine 500 may include maintaining current engine operation. As such, no aging counter may be incremented and routine 500 may then end.

If the total amount of CO and $CO_2$ downstream of the downstream GPF is less than the second threshold amount, routine 500 may proceed to 522, where routine 500 may include indicating reduced downstream GPF functionality due to downstream GPF degradation and incrementing a second aging counter by one. Specifically, if the total amount of CO and $CO_2$ downstream of the downstream GPF is lower than expected (e.g., lower than the second threshold amount), then the controller may infer that the downstream GPF may no longer be efficiently storing PM emissions for oxidation during GPF regeneration (that is, the downstream GPF may have degraded from a full useful life state). Additionally or alternatively, degradation of catalytic activity of the catalytic washcoat of the downstream GPF may be indicated.

Once the first aging counter has been incremented (e.g., at 518) or the second aging counter has been incremented (e.g., at 522), a degradation state of the upstream GPF or the downstream GPF may be correspondingly evaluated. As such, at 524, routine 500 may include determining whether an incremented aging counter (e.g., the first aging counter at 518 or the second aging counter at 522) is greater than a threshold count. If the incremented aging counter is less than or equal to the threshold count, routine 500 may proceed to 506, where routine 500 may include maintaining current engine operation. As such, no GPF degradation may be indicated and routine 500 may then end.

If the incremented aging counter is greater than the threshold count, routine 500 may proceed to 526, where routine 500 may include generating a driver indication of a degradation state or age of a given GPF (e.g., the upstream GPF or the downstream GPF), store a diagnostic code, and/or alter one or more engine operating conditions based on the given degradation state or age. For example, the driver indication may include lighting a malfunction indicator lamp (MIL) and the diagnostic code may be set and stored in memory of the controller. In one example, lighting the MIL may indicate a request that the vehicle be taken to a service technician, and the diagnostic code that is set may indicate to the service technician that the given GPF is degraded. The light and the code may then reset after the vehicle has been serviced and the given GPF has been replaced. In some examples, during vehicle operation with the degraded GPF, one or more engine operating conditions may be adjusted in view of GPF degradation. For example, one or more engine operating conditions that generate additional PM may be minimized. This may include, for example, limiting the engine load and/or richness of the exhaust gas air-fuel ratio as the age of the given GPF increases. Routine 500 may then end.

Referring now to FIG. 6, an example plot 600 showing soot oxidation capacities (as indicated by relative percentages along a y-axis) for three example GPFs under ramped temperatures and with oxygen pulses is depicted. A bar 601 depicts a soot oxidation capacity for a first example GPF having no washcoat under temperature ramping to 650° C. and a bar 602 depicts the soot oxidation capacity for the first example GPF under like temperature ramping with a 10-second, 20% oxygen pulse (e.g., to simulate an oxygen-rich environment generated by a TFSO event). A bar 611 depicts a soot oxidation capacity for a second example GPF having a catalytic washcoat including Pd and Rh under temperature ramping to 650° C. and a bar 612 depicts the soot oxidation capacity for the second example GPF under like temperature ramping with the 10-second, 20% oxygen pulse. A bar 621 depicts a soot oxidation capacity for a third example GPF having a catalytic washcoat including Ni under temperature ramping to 650° C. and a bar 622 depicts the soot oxidation capacity for the third example GPF under like temperature ramping with the 10-second, 20% oxygen pulse. Each of the example GPFs were pre-loaded with oxygen and 1 g/L soot, and then subjected to a nitrogen environment. The depicted soot oxidation capacities were determined by measuring the total amount of CO and $CO_2$ produced during soot oxidation.

As shown by bars 601 and 602, the first example GPF oxidized effectively no soot absent the oxygen pulse. Even when the oxygen pulse is provided, the first example GPF oxidized less soot when compared to the second example GPF (bars 611 and 612) and the third example GPF (bars 621 and 622). Of the two washcoated GPFs, the third example GPF exhibited the highest soot oxidation capacity under temperature ramping (as shown by comparing bar 611 to bar 621). The higher soot oxidation of the third example GPF may be ascribed to the catalytic washcoat including Ni, as Ni may provide a higher oxygen storage capacity than the catalytic washcoat including Pd and Rh in the second example GPF (thereby further promoting soot oxidation). However, when the oxygen pulse is provided, the second example GPF and the third example GPF exhibited closer soot oxidation capacities (as shown by comparing bar 612 to bar 622), as each of the GPFs were exposed to similar oxidation-promoting conditions. Yet, the third example GPF oxidized at least 25% of the soot with or without the oxygen pulse (as shown by bars 621 and 622), indicating that, in a vehicle, a GPF including nickel and no other catalytically-active metal may oxidize at least 25% of soot in an exhaust gas during either a passive or active regeneration process.

In this way, a gasoline particulate filter (GPF) is provided having a catalytic washcoat configured to oxidize soot in exhaust gas exiting a vehicle. In some examples, the catalytic washcoat may include nickel and no other catalytically-active metal. A technical effect of including nickel in the catalytic washcoat is that soot oxidation may be promoted during passive regeneration, such that a total number of active regeneration events may be reduced and thus fuel economy may be maintained. Further, the catalytic washcoat including nickel may exhibit greater oxygen storage functionality and greater tolerance to sulfur poisoning as compared to catalytic washcoats including platinum group metals. In some examples, a coverage of the catalytic washcoat may be limited to certain portions of the GPF or an additional catalytic washcoat may be provided, such that the overall cost of the GPF may be mitigated while retaining soot oxidation capacity. In further examples, an additional GPF having no catalytic washcoat may be disposed upstream of the GPF having the catalytic washcoat in an exhaust passage of the vehicle. A technical effect of including the additional GPF having no catalytic washcoat is that a useful life of the GPF having the catalytic washcoat may be extended. Further, because the additional GPF may have no catalytic washcoat, a combined cost of the GPFs may be kept relatively low.

An example of an emissions treatment device for a vehicle comprises a porous substrate configured to filter soot from exhaust gas exiting the vehicle, and a catalyst washcoat loaded on the porous substrate, the catalyst washcoat being configured to oxidize the soot during vehicle operation, wherein the catalyst washcoat comprises nickel and no other catalytically-active metal. A first example of the emissions treatment device further includes wherein the nickel is present in the catalyst washcoat at greater than 15 wt. %. A second example of the emissions treatment device, optionally including the first example of the emissions treatment device, further includes wherein a loading of the nickel in the catalyst washcoat relative to a total volume of the emissions treatment device is greater than 0.15 g/in$^3$. A third example of the emissions treatment device, optionally including one or more of the first and second examples of the emissions treatment device, further includes wherein the emissions treatment device oxidizes at least 25% of the soot in the exhaust gas during a regeneration process.

An example of a system comprises an exhaust passage, and a first gasoline particulate filter (GPF) disposed in the exhaust passage, the first GPF comprising a porous substrate and a first catalytic washcoat, wherein the first catalytic washcoat comprises a single metal, the single metal being nickel. A first example of the system further includes wherein the porous substrate comprises a plurality of passages, and the first catalytic washcoat is disposed on surfaces of the plurality of passages. A second example of the system, optionally including the first example of the system, further includes the first catalytic washcoat is disposed along a portion of a length of each of the plurality of passages, and a remaining portion of the length of each of the plurality of passages has no washcoat disposed thereon. A third example of the system, optionally including one or more of the first and second examples of the system, further comprises a second GPF disposed upstream of the first GPF in the exhaust passage, the second GPF having no catalytic washcoat. A fourth example of the system, optionally including one or more of the first through third examples of the system, further comprises a second GPF disposed downstream of the first GPF in the exhaust passage, the second GPF comprising the porous substrate and a second catalytic washcoat, wherein the second catalytic washcoat comprises one or more of nickel, platinum, palladium, and rhodium. A fifth example of the system, optionally including one or more of the first through fourth examples of the system, further includes wherein the first GPF comprises a second catalytic washcoat, the second catalytic washcoat comprising one or more of nickel, platinum, palladium, and rhodium. A sixth example of the system, optionally including one or more of the first through fifth examples of the system, further includes wherein the first catalytic washcoat and the second catalytic washcoat are arranged in a layered configuration on the porous substrate. A seventh example of the system, optionally including one or more of the first through sixth examples of the system, further includes wherein the porous substrate comprises a plurality of inlet passages and a plurality of outlet passages, the first catalytic washcoat is disposed along a portion of a length of each of the plurality of inlet passages and a portion of a length of each of the plurality of outlet passages, and the second catalytic washcoat is disposed along a remaining portion of the length of each of the plurality of inlet passages and a remaining portion of the length of each of the plurality of outlet passages. An eighth example of the system, optionally including one or more of the first through seventh examples of the system, further includes wherein the porous substrate comprises a plurality of inlet passages and a plurality of outlet passages, the first catalytic washcoat is disposed on surfaces of the plurality of inlet passages, and the second catalytic washcoat is disposed on surfaces of the plurality of outlet passages. A ninth example of the system, optionally including one or more of the first through eighth examples of the system, further includes wherein the first catalytic washcoat is disposed along a portion of a length of each of the plurality of inlet passages, the second catalytic washcoat is disposed along a portion of a length of each of the plurality of outlet passages, a remaining portion of the length of each of the plurality of inlet passages has no washcoat disposed thereon, and a remaining portion of the length of each of the plurality of outlet passages has no washcoat disposed thereon.

An example of a method for treating exhaust gas in an exhaust passage comprises flowing the exhaust gas through a first gasoline particulate filter (GPF) disposed in the exhaust passage, the first GPF having a catalytic washcoat, determining each of a first GPF load and an exhaust gas temperature at the first GPF, and responsive to each of the first GPF load being greater than a first threshold GPF load and the exhaust gas temperature being greater than a threshold temperature, passively regenerating the first GPF by altering at least one of a plurality of engine operating conditions to increase an air-fuel ratio of the exhaust gas, wherein the catalytic washcoat comprises nickel and no other metal. A first example of the method further comprises, responsive to each of the first GPF load being greater than the first threshold GPF load and the exhaust gas temperature being less than the threshold temperature, actively regenerating the first GPF by altering at least one of the plurality of engine operating conditions to increase the exhaust gas temperature above the threshold temperature. A second example of the method, optionally including the first example of the method, further comprises determining a total amount of CO and $CO_2$ downstream of the first GPF in the exhaust passage, responsive to the total amount of CO and $CO_2$ being less than a threshold amount, incrementing an aging counter by one, and responsive to the aging counter being greater than a threshold count, indicating degradation of the first GPF. A third example of the method, optionally including one or more of the first and second examples of the method, further comprises flowing the exhaust gas through a second GPF disposed in the exhaust passage upstream of the first GPF, the second GPF having no catalytic washcoat, and further responsive to each of the first GPF load being greater than the first threshold GPF load and the exhaust gas temperature being greater than the threshold temperature, passively regenerating the second GPF by altering at least one of the plurality of engine operating conditions to increase the air-fuel ratio of the exhaust gas. A fourth example of the method, optionally including one or more of the first through third examples of the method, further comprises determining a second GPF load, and responsive to each of the first GPF load being greater than the first threshold GPF load, the second GPF load being greater than a second threshold GPF load, and the exhaust gas temperature being less than the threshold temperature, actively regenerating each of the first GPF and the second GPF by altering at least one of the plurality of engine operating conditions to increase the exhaust gas temperature above the threshold temperature. A fifth example of the method, optionally including one or more of the first through fourth examples of the method, further comprises determining a total amount of CO and $CO_2$ between the first GPF and the second GPF in the exhaust passage, responsive to the total amount of CO and $CO_2$ being less than a threshold amount, incrementing an aging counter by one, and responsive to the aging counter being greater than a threshold count, indicating degradation of the second GPF.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an exhaust passage;
a first gasoline particulate filter (GPF) disposed in the exhaust passage, the first GPF comprising a porous substrate and a first catalytic washcoat; and
a second GPF disposed upstream of the first GPF in the exhaust passage, the second GPF having no catalytic washcoat,
wherein the first catalytic washcoat comprises a single metal, the single metal being nickel.

2. The system of claim 1, wherein
the porous substrate comprises a plurality of passages; and
the first catalytic washcoat is disposed on surfaces of the plurality of passages.

3. The system of claim 2, wherein
the first catalytic washcoat is disposed along a portion of a length of each of the plurality of passages, and
a remaining portion of the length of each of the plurality of passages has no washcoat disposed thereon.

4. The system of claim 1, further comprising a third GPF disposed downstream of the first GPF in the exhaust passage, the third GPF comprising the porous substrate and a third catalytic washcoat, wherein the third catalytic washcoat comprises one or more of nickel, platinum, palladium, and rhodium.

5. The system of claim 1, wherein the first GPF comprises a second catalytic washcoat, the second catalytic washcoat comprising one or more of nickel, platinum, palladium, and rhodium.

6. The system of claim 5, wherein the first catalytic washcoat and the second catalytic washcoat are arranged in a layered configuration on the porous substrate.

7. The system of claim 5, wherein
the porous substrate comprises a plurality of inlet passages and a plurality of outlet passages,
the first catalytic washcoat is disposed along a portion of a length of each of the plurality of inlet passages and a portion of a length of each of the plurality of outlet passages, and
the second catalytic washcoat is disposed along a remaining portion of the length of each of the plurality of inlet passages and a remaining portion of the length of each of the plurality of outlet passages.

8. The system of claim 5, wherein
the porous substrate comprises a plurality of inlet passages and a plurality of outlet passages,
the first catalytic washcoat is disposed on surfaces of the plurality of inlet passages, and
the second catalytic washcoat is disposed on surfaces of the plurality of outlet passages.

9. The system of claim 8, wherein
the first catalytic washcoat is disposed along a portion of a length of each of the plurality of inlet passages,
the second catalytic washcoat is disposed along a portion of a length of each of the plurality of outlet passages,
a remaining portion of the length of each of the plurality of inlet passages has no washcoat disposed thereon, and
a remaining portion of the length of each of the plurality of outlet passages has no washcoat disposed thereon.

10. A method for treating exhaust gas in an exhaust passage, comprising:
flowing the exhaust gas through a first gasoline particulate filter (GPF) disposed in the exhaust passage, the first GPF having a catalytic washcoat;
determining each of a first GPF load and an exhaust gas temperature at the first GPF;
responsive to each of the first GPF load being greater than a first threshold GPF load and the exhaust gas temperature being greater than a threshold temperature, passively regenerating the first GPF by altering at least one of a plurality of engine operating conditions to increase an air-fuel ratio of the exhaust gas;
determining a total amount of CO and $CO_2$ downstream of the first GPF in the exhaust passage;
responsive to the total amount of CO and $CO_2$ being less than a threshold amount, incrementing an aging counter by one; and
responsive to the aging counter being greater than a threshold count, indicating degradation of the first GPF, wherein the catalytic washcoat comprises nickel and no other metal.

11. The method of claim 10, further comprising, responsive to each of the first GPF load being greater than the first threshold GPF load and the exhaust gas temperature being less than the threshold temperature, actively regenerating the first GPF by altering at least one of the plurality of engine operating conditions to increase the exhaust gas temperature above the threshold temperature.

12. The method of claim 10, further comprising:
flowing the exhaust gas through a second GPF disposed in the exhaust passage upstream of the first GPF, the second GPF having no catalytic washcoat; and
further responsive to each of the first GPF load being greater than the first threshold GPF load and the exhaust gas temperature being greater than the threshold temperature, passively regenerating the second GPF by altering at least one of the plurality of engine operating conditions to increase the air-fuel ratio of the exhaust gas.

13. The method of claim 12, further comprising:
determining a second GPF load; and
responsive to each of the first GPF load being greater than the first threshold GPF load, the second GPF load being greater than a second threshold GPF load, and the exhaust gas temperature being less than the threshold temperature, actively regenerating each of the first GPF and the second GPF by altering at least one of the plurality of engine operating conditions to increase the exhaust gas temperature above the threshold temperature.

14. A system, comprising:
an exhaust passage; and
a first gasoline particulate filter (GPF) disposed in the exhaust passage, the first GPF comprising a porous substrate and a first catalytic washcoat,
wherein the first catalytic washcoat comprises a single metal, the single metal being nickel,
wherein the first GPF comprises a second catalytic washcoat, the second catalytic washcoat comprising one or more of platinum, palladium, and rhodium,
wherein the porous substrate comprises a plurality of inlet passages and a plurality of outlet passages,
wherein the first catalytic washcoat is disposed along a portion of a length of each of the plurality of inlet passages and a portion of a length of each of the plurality of outlet passages, and
wherein the second catalytic washcoat is disposed along a remaining portion of the length of each of the plurality of inlet passages and a remaining portion of the length of each of the plurality of outlet passages.

15. The system of claim 14, wherein the nickel is present in the first catalytic washcoat at greater than 15 wt. %.

16. The system of claim 14, wherein a loading of the nickel in the first catalytic washcoat relative to a total volume of the emissions treatment device is greater than 0.15 g/in$^3$.

17. A system, comprising:
an exhaust passage; and
a first gasoline particulate filter (GPF) disposed in the exhaust passage, the first GPF comprising a porous substrate and a first catalytic washcoat,
wherein the first catalytic washcoat comprises a single metal, the single metal being nickel,
wherein the first GPF comprises a second catalytic washcoat, the second catalytic washcoat comprising one or more of platinum, palladium, and rhodium,
wherein the porous substrate comprises a plurality of inlet passages and a plurality of outlet passages,
wherein the first catalytic washcoat is disposed on surfaces of the plurality of inlet passages,
wherein the second catalytic washcoat is disposed on surfaces of the plurality of outlet passages,
wherein the first catalytic washcoat is disposed along a portion of a length of each of the plurality of inlet passages,
wherein the second catalytic washcoat is disposed along a portion of a length of each of the plurality of outlet passages,
wherein a remaining portion of the length of each of the plurality of inlet passages has no washcoat disposed thereon, and
wherein a remaining portion of the length of each of the plurality of outlet passages has no washcoat disposed thereon.

18. The system of claim 17, wherein the nickel is present in the first catalytic washcoat at greater than 15 wt. %.

19. The system of claim 17, wherein a loading of the nickel in the first catalytic washcoat relative to a total volume of the emissions treatment device is greater than 0.15 g/in$^3$.

20. The system of claim 17, wherein the first catalytic washcoat and the second catalytic washcoat are arranged in a layered configuration on the porous substrate.

* * * * *